(12) United States Patent
Goncalves et al.

(10) Patent No.: US 11,505,017 B2
(45) Date of Patent: Nov. 22, 2022

(54) DEVICES INCLUDING DEPLOYABLE HITCH ASSEMBLIES AND AUTONOMOUS ENGAGEMENT SYSTEMS INCORPORATING THE SAME

(71) Applicant: Toyota Research Institute, Inc., Los Altos, CA (US)

(72) Inventors: Aimee S. Goncalves, Kingston, MA (US); Paul W. Baim, Natick, MA (US); Toffee Albina, Cambridge, MA (US); Joseph Bondaryk, Brookline, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 611 days.

(21) Appl. No.: 16/560,626

(22) Filed: Sep. 4, 2019

(65) Prior Publication Data
US 2020/0207167 A1 Jul. 2, 2020

Related U.S. Application Data

(60) Provisional application No. 62/785,379, filed on Dec. 27, 2018.

(51) Int. Cl.
*B60D 1/58* (2006.01)
*B60D 1/36* (2006.01)
(Continued)

(52) U.S. Cl.
CPC .............. *B60D 1/363* (2013.01); *B60D 1/58* (2013.01); *B62B 3/001* (2013.01); *B62B 5/0069* (2013.01);
(Continued)

(58) Field of Classification Search
CPC .... B60D 1/363; B60D 1/58; B60D 2001/001; B62B 3/001; B62B 5/0069; B62B 5/0079;
(Continued)

(56) References Cited

U.S. PATENT DOCUMENTS 6,113,343 A  9/2000 Goldenberg et al.
6,328,120 B1 12/2001 Haeussler et al.
(Continued)

FOREIGN PATENT DOCUMENTS

CA  2949306 A1  5/2018
CN  101897641   12/2011
(Continued)

OTHER PUBLICATIONS

McGinn, Conor, et al., "Design of a terrain adaptive wheeled robot for human-orientated environments," https://link.springer.com/article/10.1007/s10514-018-9701-1; Published Date: Feb. 13, 2018.
(Continued)

*Primary Examiner* — Tony H Winner
*Assistant Examiner* — Marlon A Arce
(74) *Attorney, Agent, or Firm* — Dinsmore & Shohl LLP

(57) ABSTRACT

A robotic system that includes a body, a hitch assembly coupled to the body, and a sensor array coupled to the body. The robotic system includes a processor and operating logic containing programming instructions thereon that, when executed, causes the processor to detect, via the sensor array, a location of a vehicle relative to the body. The programming instructions of the operating logic further cause the processor to detect, via the sensor array, a position of a hitch receiver along the vehicle and move the body toward the vehicle to position the hitch assembly proximate to the hitch receiver. The programming instructions of the operating logic further cause the processor to move the hitch assembly relative to the body and in alignment with the hitch receiver and engage the hitch assembly to the hitch receiver to securely couple the body to the vehicle.

20 Claims, 21 Drawing Sheets

(51) Int. Cl.
*B62B 3/00* (2006.01)
*B62B 5/00* (2006.01)
*G05D 1/03* (2006.01)
*B62D 15/02* (2006.01)
*B60D 1/00* (2006.01)

(52) U.S. Cl.
CPC ............ *B62B 5/0079* (2013.01); *B62D 15/02* (2013.01); *G05D 1/03* (2013.01); *B60D 2001/001* (2013.01)

(58) Field of Classification Search
CPC ........ B62D 15/02; B62D 63/02; B62D 61/00; G05D 1/03
See application file for complete search history.

(56) References Cited

U.S. PATENT DOCUMENTS

| | | | |
|---|---|---|---|
| 6,523,629 B1 | 2/2003 | Buttz et al. | |
| 6,644,426 B1 | 11/2003 | Larue | |
| 6,896,078 B2 | 5/2005 | Wakui | |
| 7,137,464 B2 | 11/2006 | Stahler | |
| 7,152,869 B2 | 12/2006 | Dupay et al. | |
| 7,229,139 B2 * | 6/2007 | Lu | B60W 10/18 180/6.26 |
| 7,424,923 B2 | 9/2008 | Yang et al. | |
| 7,426,970 B2 | 9/2008 | Olsen | |
| 7,434,638 B2 | 10/2008 | Tanielian | |
| 7,475,745 B1 | 1/2009 | DeRoos | |
| 7,581,746 B2 | 9/2009 | Abate et al. | |
| 7,645,110 B2 | 1/2010 | Ogawa et al. | |
| 7,721,829 B2 | 5/2010 | Lee et al. | |
| 8,066,298 B2 | 11/2011 | Alguera et al. | |
| 8,083,013 B2 | 12/2011 | Bewley et al. | |
| 8,162,351 B2 | 4/2012 | Lee et al. | |
| 8,307,923 B2 | 11/2012 | Lin et al. | |
| 8,360,178 B2 | 1/2013 | Goldenberg et al. | |
| 8,753,155 B2 | 6/2014 | Olm et al. | |
| 8,840,128 B2 | 9/2014 | Glazner | |
| 8,840,130 B2 | 9/2014 | Columbia | |
| 8,875,815 B2 | 11/2014 | Terrien et al. | |
| 8,915,692 B2 | 12/2014 | Grinnell et al. | |
| 9,032,831 B2 | 5/2015 | Sutherland | |
| 9,096,281 B1 | 8/2015 | Li et al. | |
| 9,248,875 B2 | 2/2016 | Wolf et al. | |
| 9,248,876 B2 | 2/2016 | Nuchter et al. | |
| 9,283,681 B2 | 3/2016 | Slawinski et al. | |
| 9,314,921 B2 | 4/2016 | Jacobsen et al. | |
| 9,314,929 B2 | 4/2016 | Hyde et al. | |
| 9,387,892 B2 | 7/2016 | Gettings et al. | |
| 9,387,895 B1 | 7/2016 | Theobald et al. | |
| 9,463,574 B2 | 10/2016 | Purkayastha et al. | |
| 9,475,193 B2 | 10/2016 | Bosscher et al. | |
| 9,527,213 B2 | 12/2016 | Luo et al. | |
| 9,586,636 B1 | 3/2017 | Burmeister et al. | |
| 9,616,948 B2 | 4/2017 | Ben-Tzvi et al. | |
| 9,724,829 B2 | 8/2017 | Hyde et al. | |
| 9,726,268 B1 | 8/2017 | Krasowski et al. | |
| 9,776,333 B2 | 10/2017 | Sakai et al. | |
| 9,808,383 B2 | 11/2017 | Mulhern et al. | |
| 9,902,069 B2 | 2/2018 | Farlow et al. | |
| 10,800,217 B2 * | 10/2020 | Rogan | B60R 1/00 |
| 2003/0137268 A1 | 7/2003 | Papanikolopoulos et al. | |
| 2008/0302586 A1 | 12/2008 | Yan | |
| 2010/0025964 A1 | 2/2010 | Fisk et al. | |
| 2013/0231814 A1 | 9/2013 | Sarokhan et al. | |
| 2014/0379198 A1 | 12/2014 | Amino et al. | |
| 2016/0311479 A1 | 10/2016 | Rudakevych et al. | |
| 2017/0066132 A1 | 3/2017 | Casey et al. | |
| 2017/0280960 A1 | 10/2017 | Ziegler et al. | |
| 2018/0043530 A1 | 2/2018 | Goldenberg et al. | |
| 2018/0065242 A1 | 3/2018 | Tanaka et al. | |
| 2018/0071909 A1 | 3/2018 | Bewley et al. | |
| 2018/0279214 A1 * | 9/2018 | Chandramouli | B62D 63/02 |
| 2018/0361929 A1 * | 12/2018 | Zhang | B60D 1/366 |
| 2019/0118859 A1 * | 4/2019 | Ghannam | B62D 6/005 |
| 2019/0135059 A1 * | 5/2019 | Niewiadomski | B62D 15/028 |
| 2019/0232992 A1 | 8/2019 | Bondaryk et al. | |

FOREIGN PATENT DOCUMENTS

| | | |
|---|---|---|
| CN | 101712199 B | 7/2012 |
| CN | 102718012 B | 11/2014 |
| CN | 203993868 U | 12/2014 |
| CN | 103568018 B | 9/2015 |
| CN | 105598937 A | 5/2016 |
| CN | 105666474 A | 6/2016 |
| CN | 105269593 B | 8/2016 |
| CN | 205441615 U | 8/2016 |
| CN | 106272478 A | 1/2017 |
| CN | 206296921 U | 7/2017 |
| CN | 107150336 A | 9/2017 |
| CN | 206748412 U | 12/2017 |
| CN | 107618026 A | 1/2018 |
| CN | 207669294 U | 7/2018 |
| CN | 108466278 A | 8/2018 |
| EP | 1290935 B1 | 9/2006 |
| JP | 2885367 B2 | 4/1999 |
| JP | 2001225754 | 8/2001 |
| JP | 2004195592 A | 7/2004 |
| JP | 2009166181 A | 7/2009 |
| JP | 2017164872 A | 9/2017 |
| WO | 2014162605 | 10/2014 |
| WO | 2017088048 | 6/2017 |
| WO | 2017191591 A1 | 11/2017 |

OTHER PUBLICATIONS

"StairKing battery powered stair climbing appliance truck," https://catalog.wescomfg.com/item/all-categories/liftkar-hd-stairking-and-stair-climbing-trucks/230051-1?plpver=1001 Accessed Date: Sep. 19, 2018.

"Toru", Sep. 19, 2018; URL: https://www.magazino.eu/toru-cube/?lang=en.

Richard Vaughn et al., "The Difference between Cartesian, Six-Axis, and SCARA Robots", Dec. 2, 2013, pp. 21.

* cited by examiner

DEVICES INCLUDING DEPLOYABLE HITCH ASSEMBLIES AND AUTONOMOUS ENGAGEMENT SYSTEMS INCORPORATING THE SAME

CROSS-REFERENCE TO RELATED APPLICATIONS

This application claims the benefit of U.S. Provisional Patent Application No. 62/785,379, filed Dec. 27, 2018 and entitled "Devices Including Deployable Hitch Assemblies and Autonomous Engagement Systems incorporating the Same."

TECHNICAL FIELD

The present specification generally relates to engagement systems that couple a device to a vehicle, and more specifically, to a hitch assembly of a device that includes an engagement pin system that is received within and engages a hitch receiver of a vehicle.

BACKGROUND

Various apparatuses and systems are designed to be generally compatible with vehicles, including, for example, trailers, cargo carriers, lifts, racks, and the like. These apparatuses may be secured to a vehicle for transportation between locations by various means, including, for example, by securing the apparatus to a hitch receiver of the vehicle. Fastening a device or apparatus to the hitch receiver of a vehicle requires manually engaging the hitch receiver of the vehicle to a corresponding engagement mechanism of the device or apparatus, with said engagement process generally being physically intensive and time consuming. Accordingly, there exists a lack of apparatuses designed to include autonomous systems that are particularly compatible for use with and engagement to vehicles.

SUMMARY

In one embodiment, a hitch assembly includes a housing, a pair of pins disposed within the housing, wherein each pin of the pair of pins includes a tab disposed within the housing, and a biasing mechanism disposed within the housing and coupled to the tab of each of the pins such that the biasing mechanism extends between the pair of pins. The biasing mechanism biases the tabs of each of the pins laterally outward relative to the housing to thereby extend the pair of pins out from the housing. The hitch assembly further includes a cam feature disposed within the housing and coupled to the pair of pins along each of the tabs, with the cam feature being translatable within the housing. The cam feature overcomes a bias of the biasing mechanism when a force on the cam feature causes the cam feature to translate within the housing, and the cam feature engages and retracts the tabs laterally inward relative to the housing to thereby pull the pair of pins into the housing when the cam feature translates within the housing.

In another embodiment, a robotic apparatus includes a body, a hitch assembly coupled to the body and including a housing, a pair of engagement pins disposed within the housing, wherein each pin of the pair of engagement pins includes a tab disposed within the housing, and a spring disposed within the housing and coupled to each of the tabs such that the spring extends between the pair of engagement pins. The spring exerts an outward force against the tabs of the pair of engagement pins such that the pair of engagement pins are biased laterally outward from the housing. The hitch assembly further includes a cam feature disposed within the housing and coupled to each of the tabs of the pair of engagement pins, the cam feature being translatable within the housing. The cam feature pulls the tabs inward into the housing when a force on the cam feature causes the cam feature to translate, and the force applied to the cam feature overcomes the outward force of the spring such that translation of the cam feature within the housing retracts the pair of engagement pins into the housing.

In another embodiment, a hitch assembly includes a housing, a pair of pins disposed within the housing, and a pin actuator disposed within the housing and coupled to the pair of pins by a pair of cables. The pin actuator being rotatable within the housing and extends the pair of pins laterally outward from the housing by pushing the pair of pins with the cables coupled thereto when the pin actuator rotates within the housing in a first direction. The pin actuator retracts the pair of pins laterally inward into the housing by pulling the pair of pins with the cables coupled thereto when the pin actuator rotates within the housing in a second direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
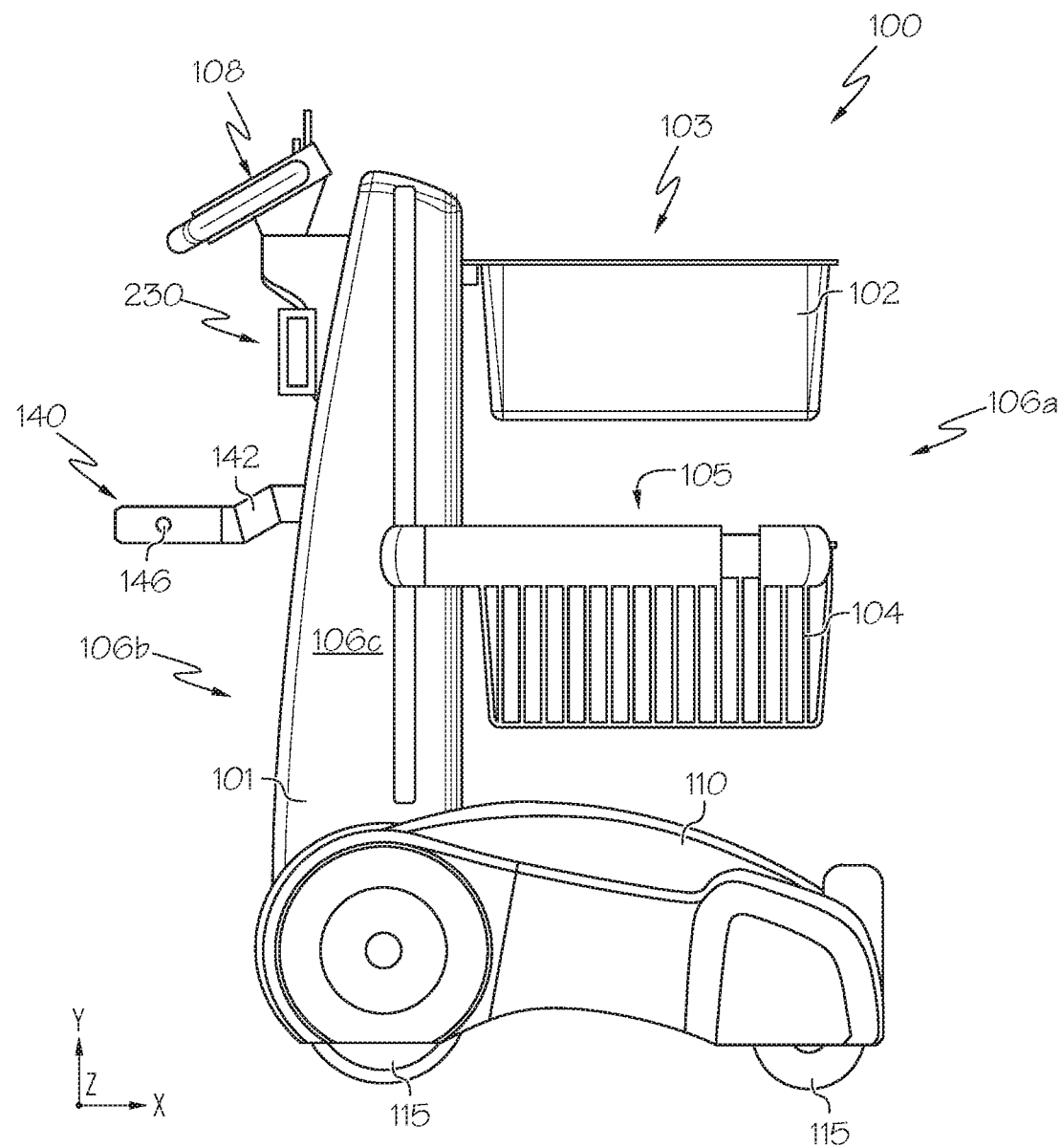
FIG. 1 schematically depicts an illustrative robotic system including a hitch assembly according to one or more embodiments shown and described herein.

The present disclosure relates generally to devices, such as robotic systems, that are easily transportable by use of a vehicle, thereby increasing the mobility and the operating range of the robotic systems relative to other devices or robot systems. The robotic systems described herein are capable of being mounted to standard and/or customized trailer hitches on vehicles such that the robotic systems can be transported by the vehicles. The robot systems are not limited by this disclosure, and may generally be any robot systems, particularly those that would be useful to transport, such as robotic systems that assist humans with everyday tasks, robotic systems that provide movement of goods from an origin location, such as a shopping center and/or grocery store, to a final delivery destination, such as a home, and/or the like. Further, although the embodiments are described herein in the context of robotic systems, embodiments are not limited thereto. Embodiments described herein may be employed in any device capable of being hitched to a vehicle.

For example, an operator of the robotic system may desire to transport goods from the origin location to the final destination as fast as possible and with a least amount of physical labor required on behalf of the operator as possible. A robotic system may facilitate such transport by receiving and storing a plurality of goods therein while also autonomously locating a vehicle for purposes of navigating itself toward the vehicle. The robotic systems described herein may further facilitate delivery of goods to the respective final destination to increase the speed in which the goods are delivered while also reducing the manual labor required by an operator in transporting said goods to the vehicle and/or the final destination by including systems capable of autonomously mounting the robotic system to a standard vehicle hitch receiver. Accordingly, the robotic systems described herein generally include various components that allow for autonomously locating a vehicle hitch receiver (e.g., a standard vehicle hitch receiver or a custom vehicle hitch receiver) and autonomously coupling/decoupling the robotic systems from the vehicle hitch receiver.

In particular, the present disclosure generally relates to robotic systems including hitch assemblies that facilitate the engagement of the robotic system to a hitch receiver of a vehicle. The hitch assembly includes a housing having a pair of engagement pins disposed within the housing. Each of the pair of pins includes at least one tab secured thereto and disposed within the housing, with the tabs being coupled to a biasing mechanism that extends between the pair of pins and exerts an outward bias (i.e., force) onto the pair of pins. The outward bias of the biasing mechanism extends the pair of pins laterally outward relative to the housing. With the hitch assembly received within a corresponding hitch receiver of a vehicle, the outward bias of the biasing mechanism may extend the pair of pins through a pair of apertures of the hitch receiver for engagement with the vehicle when the hitch assembly of the robotic system is received therein. A cam feature disposed within the housing and coupled to the pair of pins along each tab is slidably translatable within the housing to overcome the bias of the biasing mechanism. Translation of the cam feature provides for a retraction of the tabs of each of the pair of pins, laterally inward relative to the housing, to thereby retract the pins inward into the housing and to facilitate insertion and removal of the hitch assembly with the hitch receiver of the vehicle.

The present disclosure further relates to robotic systems including hitch assemblies that include retractable mechanisms for selectively stowing and deploying the hitch assembly from a body of the robotic system. The hitch assembly may be retracted to stow the hitch assembly away when the hitch assembly of the robotic system is not in use, and alternatively the hitch assembly may be extended outwardly to deploy the hitch assembly when the hitch assembly of the robotic system is utilized to secure the robotic system to a vehicle. The hitch assembly is pivotable about a joint disposed within the body of the robotic system and is driven by various actuation mechanisms, including, for example, a motor of the robotic system. The present disclosure further relates to robotic systems including hitch assemblies that include a static mechanism that is not retractable from a body of the robotic system, such that the hitch assembly is maintained in fixed orientation relative to the body when transitioning between a stowed state and deployed state. The hitch assembly further includes locking mechanisms to maintain the hitch assembly in the proper orientation when the robotic system is in use to ensure the hitch assembly is not inadvertently retracted and/or extended.

Further, the present disclosure generally relates to systems and methods for autonomously detecting, routing and connecting the robotic system to a vehicle. The robotic system may include operating logic containing programming instructions that facilitate the detection of a vehicle, and in particular a hitch receiver of a vehicle, and determine a travel trajectory of the robotic system toward the vehicle to route the robotic system to the vehicle for docking. The operating logic may further provide for identifying a location of a hitch receiver relative to a hitch assembly of the robotic system to determine a motion control of the hitch assembly along a body of the robotic system for aligning the hitch assembly with the hitch receiver of the vehicle. The robotic system may include various devices, such as, for example, sensors, Lidar, and/or cameras that detect pose data utilized by the operating logic to perform a pose estimation of the vehicle and hitch receiver, respectively.

Although embodiments herein are described in the context of hitch assemblies of a robotic system for coupling with a hitch receiver of a vehicle, embodiments are not limited thereto. For example, the hitch assemblies described herein may be configured and compatible for engagement with various devices, including, for example, wheelchairs, motorcycles, bicycles, watercrafts, aircrafts, and/or the like. Other uses should generally be understood and are included within the scope of the present disclosure.

As used herein, the term "robotic system" refers to any robot system that is capable of being coupled to or removed from a standard vehicle hitch and/or a modified vehicle hitch that has an integrated communications/power interface. That is, the robotic systems described herein are not limited to robot systems that are limited to a particular use, but rather any robot system that has hitch mounted capabilities as described herein. In addition, it should be understood that the robotic systems described herein may not be mounted to a vehicle hitch at times.

Referring now to the drawings, FIG. 1 depicts a non-limiting illustrative robotic system 100. Generally, the illustrative robotic system 100 depicted in FIG. 1 may provide particular use in assisting people with obtaining goods from a store (e.g., groceries from a grocery store), transporting the goods to an end location (e.g., the person's home), delivering packages to a recipient, and/or the like. However, it should be appreciated that the robotic system 100 is not limited to this use and may be used for other purposes without departing from the scope of the present disclosure. For example, the robotic system 100 may be used in other fields, such as the healthcare field, the manufacturing field, and/or the like.

The example robotic system 100 generally includes a body 101 supported on a base 110. In some embodiments, the body 101 may have a plurality of surfaces, including, but not limited to, a front side 106a, a back side 106b, and a pair of lateral sides 106c. The various surfaces may support one or more components of the robotic system 100, as described in further detail herein. The base 110 of the robotic system 100 may be coupled to one or more mobility components, such as, for example, treads, legs, rollers, and/or the like. In the present example, the mobility component(s) of the robotic system 100 include one or more wheels 115 rotatably coupled to the base 110. In some embodiments, at least one of the one or more wheels 115 may be coupled to a drive mechanism (e.g., a motor) such that the wheels 115 may be rotated to move the robotic system 100 across a surface, as described in greater detail herein. In some embodiments, the wheels 115 may not be coupled to a drive mechanism, but rather the robotic system 100 is moved by receiving an external force (e.g., a user pushes or pulls the robotic system 100) to cause the wheels 115 to rotate and the robotic system 100 to move, in some embodiments, at least one of the wheels 115 may be movable around a plurality of axes such that the wheel 115 is steerable.

The wheels 115 are otherwise not limited by the present disclosure and may contain any other features. For example, the wheels 115 may be adapted for moving over varied and/or unpaved terrain, adapted for lifting the robotic system 100 up a single step (such as a curb sir the like), adapted to move in inclement weather conditions, and/or the like. While FIG. 1 depicts the wheels 115 as the mobility components, it should be appreciated that the present disclosure is not limited to such. As a non-limiting example, the mobility components may be driver tracks that provide the robotic system 100 with an ability to move (e.g., a tracked robot).

In various embodiments, the robotic system 100 may include one or more storage compartments for holding items. It should be understood that the embodiments are not limited to having storage compartments and that the robotic system 100 described and illustrated herein are for illustrative purposes only. For example, the robotic system 100 may have one or more storage compartments for holding items that are purchased at a store, holding items as the robotic system 100 is transported via a trailer hitch, securing items, and/or the like. As a non-limiting example, as shown in FIG. 1, the robotic system 100 may have an upper storage compartment 102 and/or a lower storage compartment 104. The upper storage compartment 102 may extend from the front side 106a and have a cavity 103 for holding items. Similarly, the lower storage compartment 104 may extend from the front side 106a and may also have a cavity 105 for holding items. The upper storage compartment 102 and the lower storage compartment 104 are generally not limited by this disclosure, and may be any component having a cavity for holding items. As such, both the upper storage compartment 102 and the lower storage compartment 104 may have any number of sides, walls, may have any dimensions, may be constructed of any material, may include shelves, may include racks, and/or the like. In some embodiments, the upper storage compartment 102 and/or the lower storage compartment 104 may include a removable cover (not shown) or the like that at least partially encloses the contents within the respective cavities 103, 105.

Still referring to FIG. 1, the robotic system 100 may include various components that allow the robotic system 100 to be manually pushed and/or pulled around a space, be semi-automatically driven by a user, and/or have autonomous movement capabilities that allow the robotic system 100 to move around a space with little or no input from a user. That is, the robotic system 100 may include components that allow for operation in a full manual mode, a manual assist mode, a semi-autonomous mode, and/or an autonomous mode, as described in greater detail herein. For example, in some embodiments, the robotic system 100 may include one or more handles (not shown) that are positioned and arranged for a user to grasp. In other embodiments, the robotic system 100 includes a user interface device 108 integrated therein or coupled thereto, which may include various components such as buttons, switches, joysticks, and/or the like. Alternatively, the user interface device 108 may be a display (e.g., a touch screen display). Irrespective of the physical form, the user interface device 108 may generally provide one or more user-facing functions, including, but not limited to, providing the user with controls for controlling settings of the robotic system 100, allowing a user to provide inputs for moving the robotic system 100 (e.g., to automatically or semi-automatically drive the robotic system 100), to lock one or more portions of the robotic system 100 (e.g., a hitch assembly 140), to provide commands that allow the robotic system 100 to autonomously move, and/or the like.

As will be described in greater detail herein, in some embodiments, the user interface device 108 may be used to actuate a hitch assembly 140 of the robotic system 100 (i.e., provide controls for extending or retracting the hitch assembly 140 from the body 101 of the robotic system 100), providing the user with controls for detecting and identifying a location of a hitch receiver of a vehicle, providing the user with controls for detecting and coupling the hitch assembly 140 of the robotic system 100 to a hitch receiver of a vehicle, and/or the like.

Figure 4:
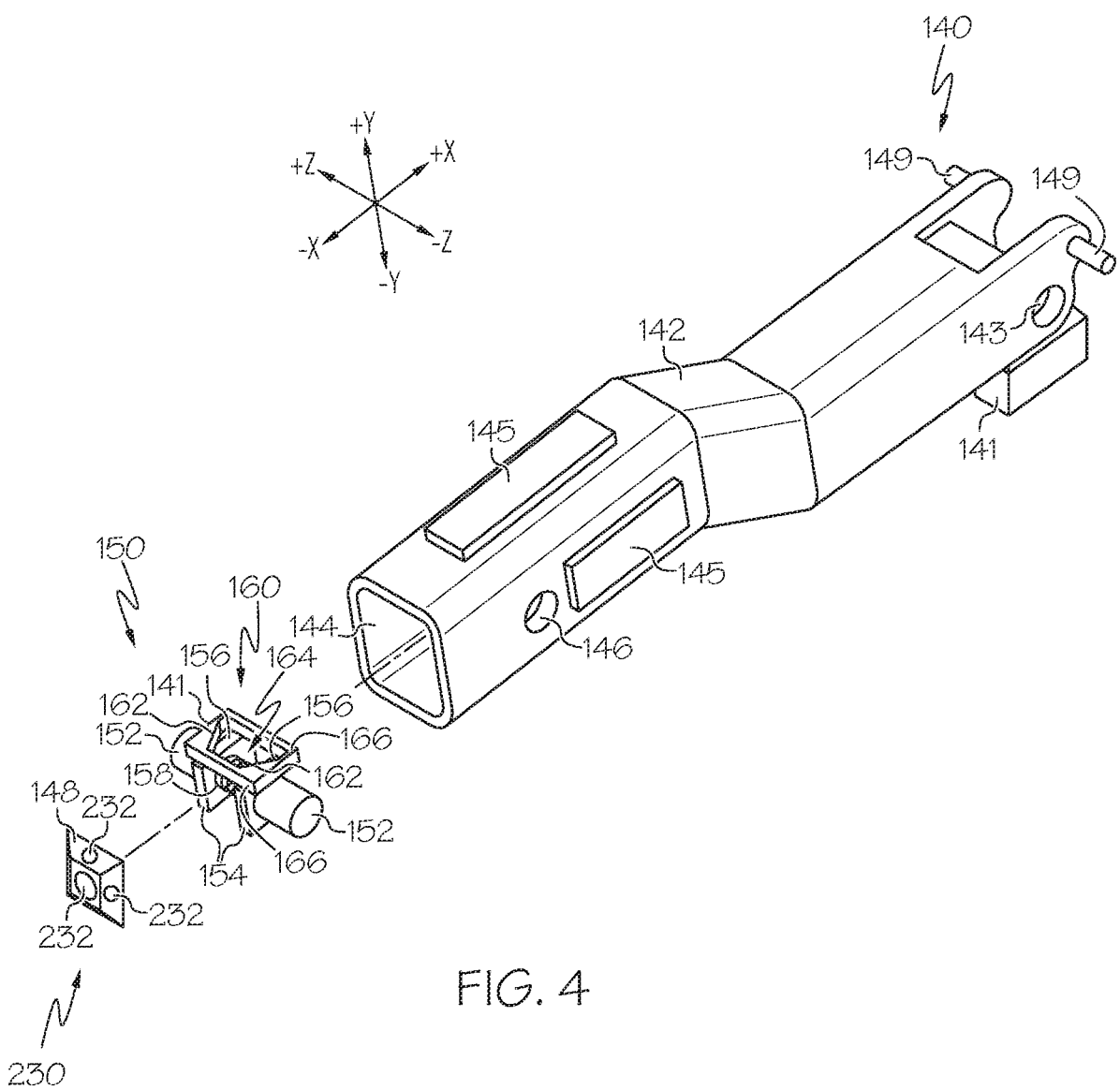
FIG. 4 schematically depicts an exploded view of the hitch assembly of FIG. 1 including a pair of engagement pins and a sensor array according to one or more embodiments shown and described herein.

In some embodiments, the user interface device 108 may be able to decouple from the body 101 such that a user may carry the user interface device 108 separately from the robotic system 100 and use the user interface device 108 to remotely control one or more aspects of the robotic system 100 and/or components thereof. It should be understood that the user interface device 108 may provide other functionality not specifically described herein without departing from the scope of the present disclosure. In various embodiments, the user interface device 108 may be integrated with one or more additional hardware components within the robotic system 100 (FIG. 4).

Still referring to FIG. 1, the robotic system 100 may include one or more sensor arrays 230 mounted thereto, such as, for example, the body 101, a hitch assembly 140, and/or the like. Still referring to FIG. 1, the sensor array 230 may include various components (e.g., sensors 232 shown and described in further detail herein) for sensing an environment around the robotic system 100 for the purposes of autonomous and/or semi-autonomous movement of the robotic system 100, for detecting pose data of a targeted-object, such as, for example, a vehicle, a hitch receiver of a vehicle, and/or the like. Still referring to FIG. 1, the various components of the sensor array 230 are not limited by the present disclosure, and may generally be any components that provide the functionality described herein. For example, the sensor array 230 may include one or more imaging devices, including cameras, optical sensors, ranging systems, time of flight (TOF) sensors, proximity sensing systems, laser emitting devices, and/or the like. It should be understood that in other embodiments the robotic system 100 may not include a sensor array and/or sensors.

In some embodiments, the sensor array 230 may include ogle or more sensors, such as at least a pose sensor and a receiver sensor, with the pose sensor being any one of a camera (single, stereo, time of flight, depth, etc.), Lidar sensor, ultrasonic sensor, radar sensor, laser ranging sensor, and/or the like. As will be described in greater detail herein, a pose sensor of the sensor array 230 is operable to detect a pose of a vehicle relative to the robotic system 100 for purposes of estimating a distance between the vehicle and the robotic system 100 and generating a travel trajectory therebetween. Additionally, a receiver sensor may be any one of a camera (e.g., single, stereo, time of flight, visible, infrared, depth, Lidar sensor, RFID sensor, RF direction funding sensor, and/or the like. As will be further described herein, the receiver sensor is operable to detect a location of a hitch receiver of a vehicle relative to a hitch assembly 140 of the robotic system 100 for purposes of localizing the position of the hitch receiver and generating a motion control plan for adjusting a height of the hitch assembly 140 relative to the body 101 of the robotic system 100.

Still referring to FIG. 1, the robotic system 100 may have one or more components for coupling the robotic system 100 to an object, such as, for example, a vehicle hitch receiver as described in further detail herein. Illustrative components include, but are not limited to a hitch assembly 140 that is insertable into a hitch receiver of a vehicle; a coupling mechanism 150 that engages a hitch receiver of a vehicle; and a height adjustment mechanism 180 that raises the robotic system 100 to thereby be transportable with a vehicle. Other components that gray be used to facilitate coupling as described herein should be understood and are included within the scope of the present disclosure. The hitch assembly 140 may generally be shaped and sized so as to fit into a trailer hitch receiver, as described in greater detail herein with respect to FIGS. 7-12.

Figure 2:
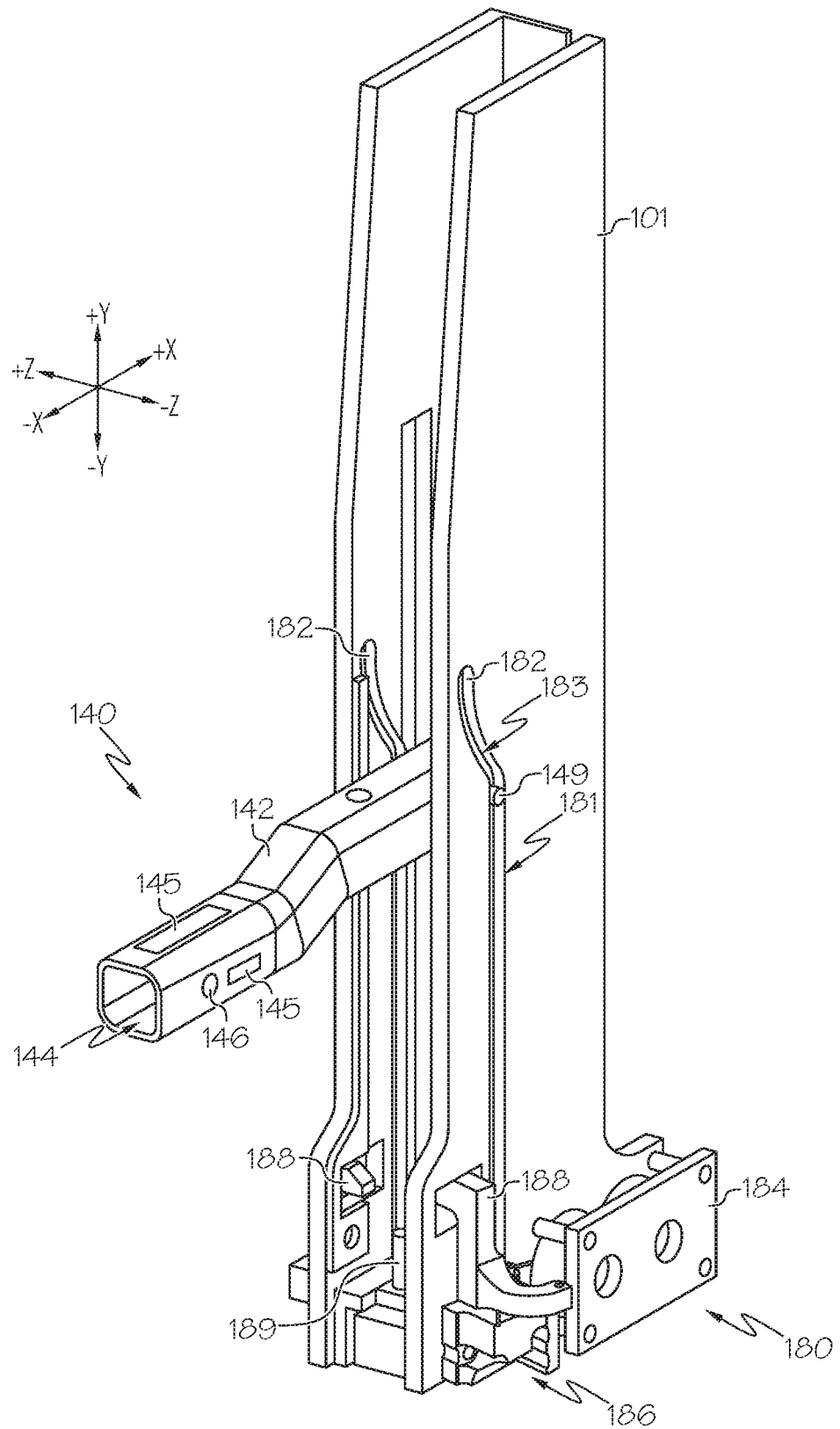
FIG. 2 schematically depicts the hitch assembly of FIG. 1 extending from the robotic system according to one or more embodiments shown and described herein.

Referring now to FIG. 2, an example hitch assembly 140 of the robotic system 100 includes an elongated housing 142 defining a hollow interior 144 disposed therein. As will be described in greater detail herein, the hollow interior 144 of the elongated housing 142 is sized and shaped to receive and include one or more coupling mechanisms therein. The hitch assembly 140 may be used in the robotic system 100 of FIG. 1 or in any other device or system. In some embodiments the hitch assembly 140 may be coupled to a height adjustment mechanism 180 for controlling movement of the hitch assembly 140 (e.g., translation of the hitch assembly 140 vertically and/or laterally relative to the body 101). In other words, the height adjustment mechanism 180 may be a mechanism that adjusts a height of the hitch assembly 140 relative to the body 101 of the robotic system 100, which allows the robotic system 100 to be lifted off the ground for transport, as described in greater detail herein with respect to FIGS. 15A-15B. Additionally, the height adjustment mechanism 180 may be a mechanism that adjusts an orientation of the hitch assembly 140 relative to the body 101, which allows the hitch assembly 140 to be stowed away when not in use and deployed when in use to facilitate coupling with a vehicle (FIGS. 3A-3C).

The height adjustment mechanism 180 automatically drives the hitch assembly 140 in an upwards motion (e.g., in the +Y direction of the coordinate axes of FIG. 2) or in a downward motion (e.g., in the −Y direction of the coordinate axes of FIG. 2) in a system vertical direction (i.e., along the +Y/−Y axis of the coordinate axes of FIG. 2). Additionally, the height adjustment mechanism 180 may further be any device or mechanism to lift the robotic system 100 off the around surface and/or capable of supporting a weight of the robotic system 100 when coupled to a vehicle. The height adjustment mechanism 180 may also provide for an outward extension and retraction of the hitch assembly 140 to deploy and/or stow the hitch assembly 140 simultaneously as the hitch assembly 140 is moved in a system vertical direction (i.e., along the +Y/−Y axis of the coordinate axes of FIG. 6) as described above. For example, in the embodiment depicted in FIG. 2, the height adjustment mechanism 180 includes a track 182, an actuator assembly 184, and a locking mechanism 186 that collectively facilitate movement, and more specifically a translation, extension and retraction of the hitch assembly 140 relative to the body 101 of the robotic system 100.

Still referring to FIG. 2, the hitch assembly 140 includes a pair of pins 149 that are slidably received within the track 182 such that the hitch assembly 140 is translatable along the track 182 in a system vertical direction (i.e., along the +Y/−Y axis of the coordinate axes of FIG. 2). It should be understood that the hitch assembly 140 is coupled to the track 182 proximate to a coupling end 141 of the elongated housing 142 opposite of an insertion end 148 as described in greater detail herein. For example, the elongated housing 142 may include a pair of pins 149 extending laterally outward from the elongated housing 142 adjacent to, but not positioned along, the coupling end 141 as shown and described in greater detail herein. The pair of pins 149 is sized to be received within the track 182 such that the track 182 defines a predetermined travel path of the hitch assembly 140. In this instance, the pair of pins 149 is movable along the track 182 to thereby facilitate translation of the hitch assembly 140 relative to the body 101. It should be understood that the track 182 may have various suitable travel paths formed along the body 101, including but not limited to, a linear travel path, a nonlinear travel path, and/or the like. In the embodiment depicted in FIG. 2, the track 182 includes a linear segment 181 and a nonlinear segment 183, with the nonlinear segment 183 of the track 182 formed along an upper portion of the track 182 relative to the linear segment 181, such that the track 182 includes an irregular travel path extending along the body 101. As described in greater detail herein, the irregular travel path of the track 182, as partially formed by the nonlinear segment 183, provides for the extension and retraction of the hitch assembly 140 from within the body 101.

Figure 3A:
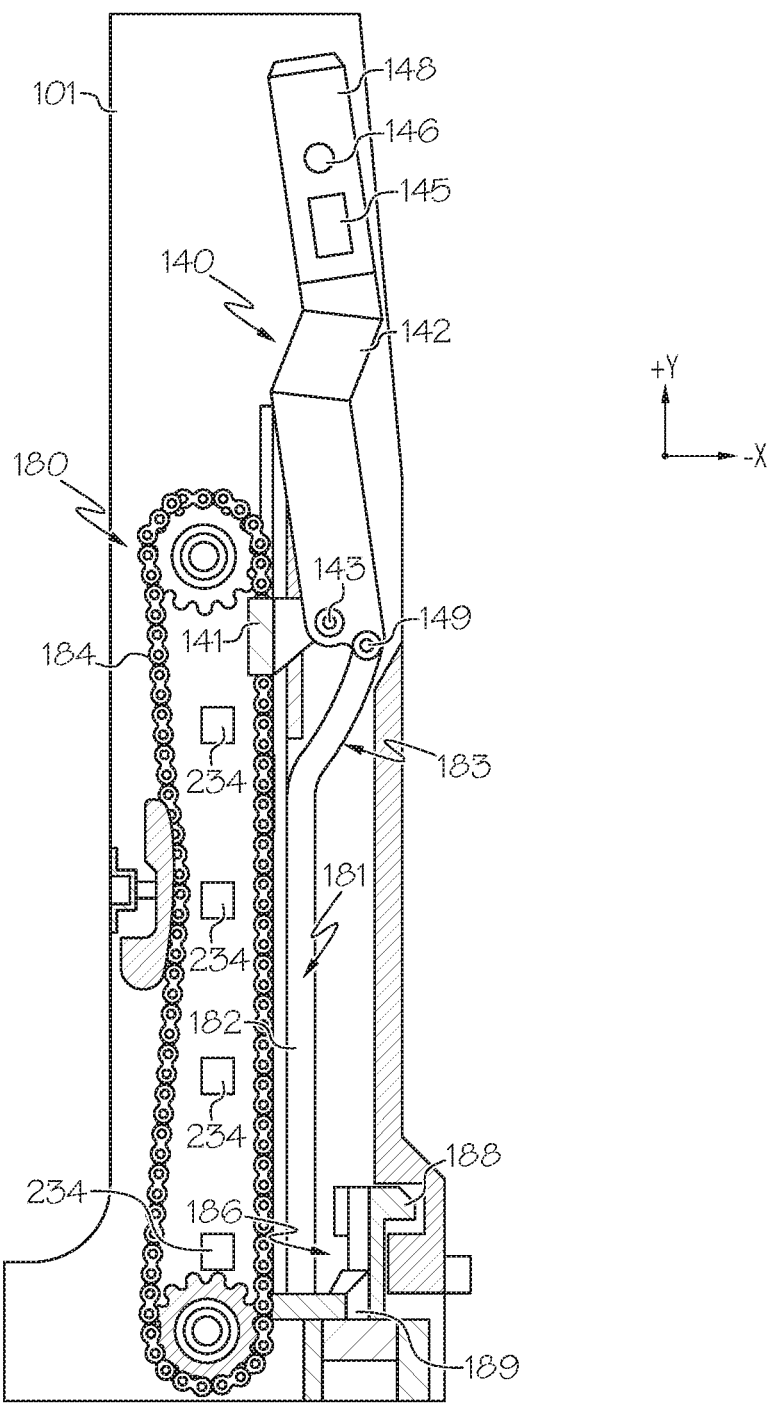
FIG. 3A schematically depicts the hitch assembly of FIG. 1 in a stowed position and coupled to an actuator assembly according to one or more embodiments shown and described herein.
Figure 3B:
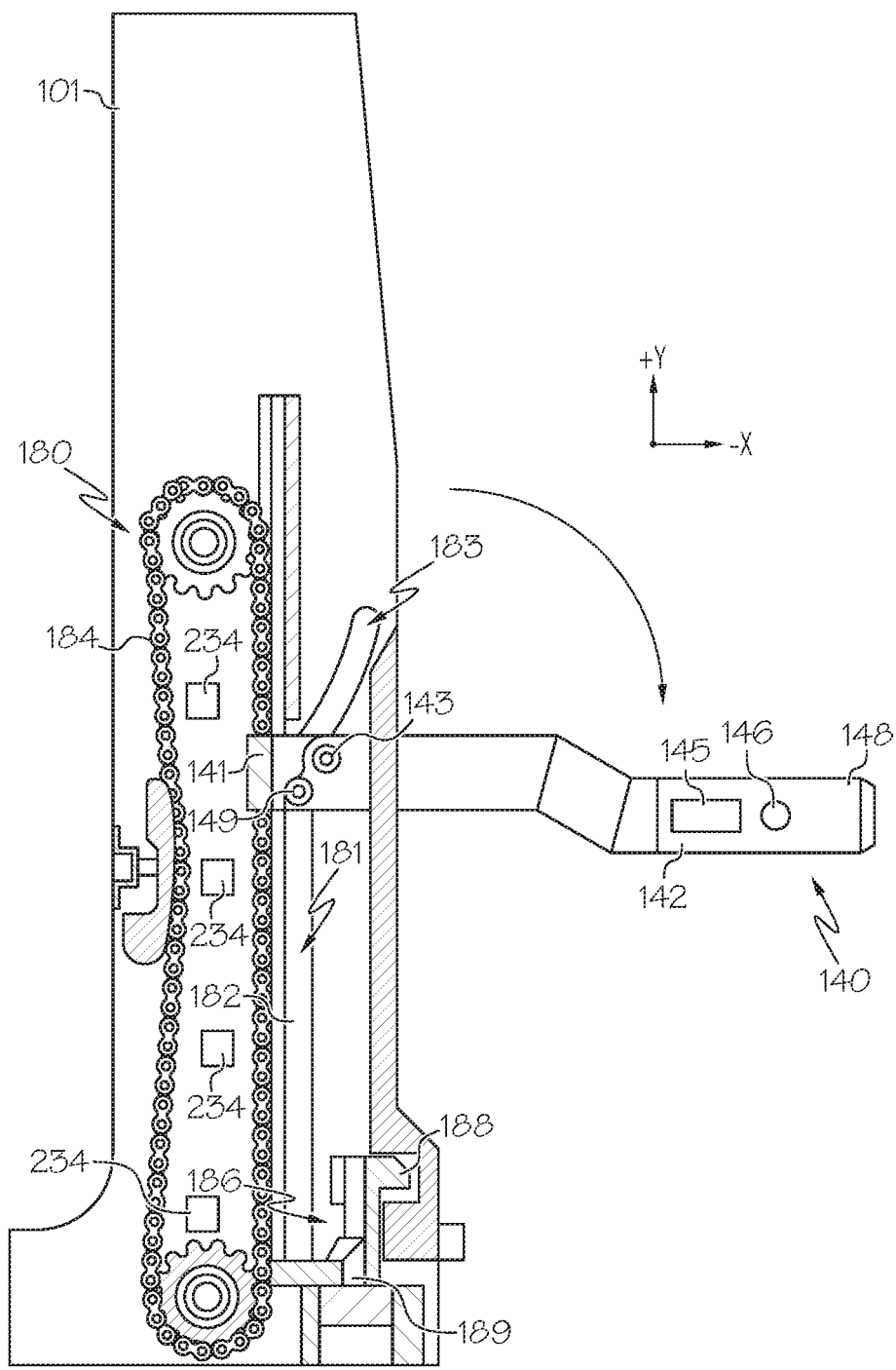
FIG. 3B schematically depicts the hitch assembly of FIG. 1 rotated outwardly to a first hitching position according to one or more embodiments shown and described herein.
Figure 3C:
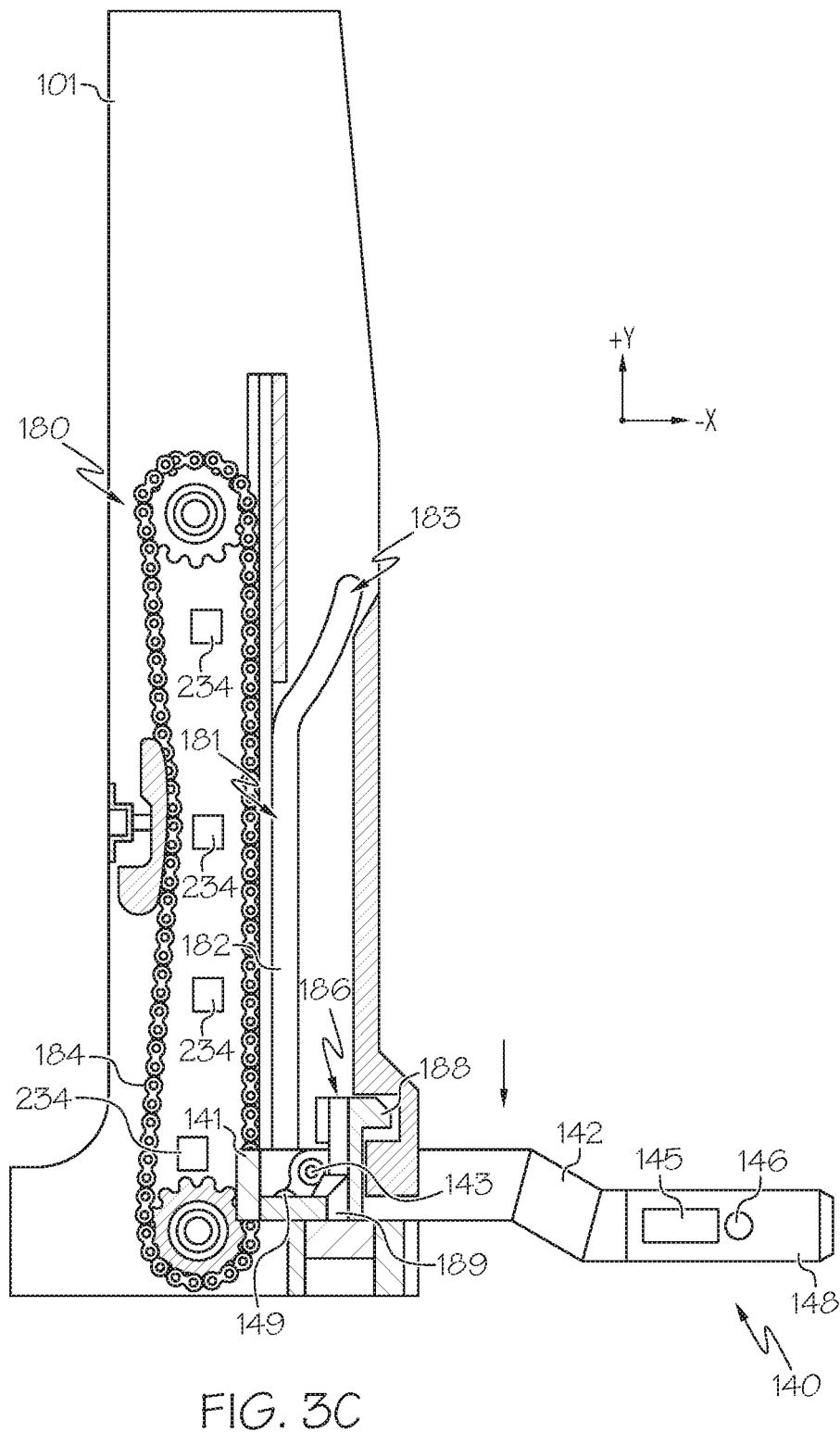
FIG. 3C schematically depicts the hitch assembly of FIG. 1 translated relatively downward along a track of the robotic system in a second hitching position according to one or more embodiments shown and described herein.

Referring now to FIG. 3A, the hitch assembly 140 is depicted in a retracted, stowed state with the elongated housing 142 disposed within the body 101, such that the hitch assembly 140 is not extended from the robotic system 100. It should be understood that the hitch assembly 140 is transitioned to the stowed state when the hitch assembly 140 is not in use. In this instance, the pair of pins 149 of the hitch assembly 140 is received within the track 182 along the nonlinear segment 183, and the hitch assembly 140 is oriented vertically in parallel with a longitudinal length of the body 101 (i.e., in a system vertical direction along the +Y/−Y axis of the coordinate axes of FIG. 3A). The actuator assembly 184 of the height adjustment mechanism 180 is disposed within the body 101 and coupled to the hitch assembly 140 at the coupling end 141 of the elongated housing 142.

The actuator assembly 184 may include, but is not limited to, a chain drive mechanism, a belt drive mechanism, a hydraulic lift, a pneumatic lift, a linear drive motor, a lead screw, a plurality of mechanical linkages (e.g., a scissor lift mechanism), a ribbon lift (i.e., a zip lift), and/or the like. Other means of driving the movement of the hitch assembly 140 as described herein are contemplated and included within the scope of the present disclosure. Accordingly, actuation of the actuator assembly 184 provides for a movement of the hitch assembly 140, and in particular, the coupling end 141 coupled thereto. In this instance, with the coupling end 141 coupled to the elongated housing 142 and the elongated housing 142 coupled to the track 182, the hitch assembly 140 effectively moves along the travel path of the track 182 as the actuator assembly 184 is actuated. In the embodiment of FIG. 3A, the actuator assembly 184 of the height adjustment mechanism 180 includes a chain drive mechanism disposed within the body 101. It should be understood that in other embodiments the actuator assembly 184 may include various other forms.

As best seen in FIG. 3A and as generally described above, the coupling end 141 of the hitch assembly 140 is coupled to the elongated housing 142 at a pivot joint 143. The coupling end 141 is separated from the elongated housing 142 due to the relative rotation of the elongated housing 142 about the pivot joint 143. In other words, with the pair of pins 149 received within the nonlinear segment 183 of the track 182 and the coupling end 141 of the hitch assembly 140 positioned along an upper portion of the actuator assembly 184 (e.g., a chain drive mechanism), the elongated housing 142 is oriented in the retracted state. More specifically, the elongated housing 142 is rotated upward (i.e., in the +Y system vertical direction of the coordinate axes of FIG. 3A) relative to the coupling end 141 and fully disposed within the body 101. It should be understood that the hitch assembly 140 may be disposed within the body 101 of the robotic system 100 when the robotic system 100 is not being used, when the robotic system 100 is not coupled to a hitch receiver of a vehicle or other device. Alternatively, it should be understood that in some embodiments the elongated housing 142 of the hitch assembly 140 is not fully disposed within the body 101 of the robotic system 100 when in the retracted state such that at least a portion of the hitch assembly 140 is disposed therefrom.

In some embodiments, the robotic system 100 further includes one or more limit switches 234 disposed within the body 101, and more particularly positioned in alignment with the height adjustment mechanism 180. In the present example, the robotic system 100 includes a plurality of limit switches 234 positioned proximately along the actuator assembly 184 such that the plurality of limit switches 234 are disposed along a longitudinal length of the height adjustment mechanism 180. The plurality of limit switches 234 are configured to detect a relative movement of a physical object within a predetermined vicinity of each of the limit switches 234, such as, for example, the hitch assembly 140 coupled to the actuator assembly 184. As described in greater detail herein, translation of the hitch assembly 140 along the tracks 182 is provided in response to an actuation of the height adjustment mechanism 180 and a movement of the coupling end 141 along the actuator assembly 184. In this instance, each of the limit switches 234 is operable to detect a presence and motion of the coupling end 141 passing by a location of a respective the limit switch 234. For example, in some embodiments the limit switch 234 may include a reed switch configured to detect a proximity of a corresponding magnet secured to the coupling end 141. In other embodiments, the limit switch 234 may include a proximity switch or Hall Effect sensor configured to detect a disturbance of an electromagnetic field, by capacitance, or by sensing a magnetic field generated by the coupling end 141. In response to detecting a presence and motion of the coupling end 141 passing by a particular limit switch 234, a corresponding position of the hitch assembly 140 is determined, such as a stowed position (see FIG. 3A), a first hitching position (see FIG. 3B), a second hitching position (see FIG. 3C), and more.

Referring now to FIG. 3B, actuation of the actuator assembly 184 provides for the downward translation (i.e., in the −Y system vertical direction of the coordinate axes of FIG. 3B) of the coupling end 141, thereby causing a rotation of the hitch assembly 140 from the stowed position (FIG. 3A) to a hitching position where the elongated housing 142 of the hitch assembly 140 extends laterally outward from the body 101 of the robotic system 100. It should be understood that actuation of the actuator assembly 184 provides for the downward translation of the pair of pins 149 within the track 182 such that as the pins 149 translate through the nonlinear segment 183 of the track 182 and toward the linear segment 181, the elongated housing 142 rotates outwardly. In this instance, the elongated housing 142 rotates about the pivot joint 143 and engages the coupling end 141 such that the elongated housing 142 is no longer separated from the coupling end 141. As seen in FIG. 3B, the hitch assembly 140 is positioned at a first height and/or first hitching position relative to the body 101, wherein the first hitching position is a maximum vertical height of the hitch assembly 140 relative to the track 182 and/or a ground surface supporting the robotic system 100. The first hitching position of the hitch assembly 140 is a maximum vertical height as the pair of pins 149 are positioned at a terminal end of the track 182 such that the pair of pins 149 are not operable to translate any further in the system vertical direction along the +Y axis of the coordinate axes of FIG. 3B). It should be understood that the hitch assembly 140 may be extended outward from the body 101 of the robotic system 100 when the robotic system 100 is being coupled to a vehicle, and in particular when the hitch assembly 140 is being coupled to a hitch receiver of a vehicle.

Referring now to FIG. 3C, further actuation of the actuator assembly 184 provides for the vertical translation of the hitch assembly 140 in a system vertical direction (i.e., along the +Y/−Y axis of the coordinate axes of FIG. 3C) from the first hitching position. (FIG. 3B) to a second hitching position. In this instance, the elongated housing 142 of the hitch assembly 140 extends laterally outward from the body 101 of the robotic system 100 at a relatively lower height than the first height of the first hitching position of the hitch assembly 140, as shown and described above. It should be understood that the continued actuation of the actuator assembly 184 provides for the continued downward translation of the pins 149 within the track 182 in a system vertical direction (i.e., along the +Y/−Y axis of the coordinate axes of FIG. 3C) such that as the pins 149 translate through the linear segment 181 of the track 182, the elongated housing 142 maintains a constant orientation relative to the body 101 (i.e., in the hitching position parallel to the system horizontal direction along the +X/−X axis of the coordinate axes of FIG. 3C). It should be understood that the hitch assembly 140 may be repositioned and translated to a plurality of hitching positions between the first hitching position (FIG. 3B) and the second hitching position (FIG. 3C) such that the hitch assembly 140 may be aligned at various heights along the body 101 relative to a ground surface.

In this instance, with the hitch assembly 140 positioned at the second hitching position, the hitch assembly 140 is positioned at a minimum vertical height relative to the track 182, the body 101, and/or a ground surface. The second hitching position of the hitch assembly 140 is a minimum vertical height of the hitch assembly 140 as the pair of pins 149 are positioned at a terminal end of the track 182 such that the pair of pins 149 are not operable to translate any further in the system vertical direction along the −Y axis of the coordinate axes of FIG. 3C). It should be understood that the hitch assembly 140 may be translated to the second hitching position relative to the body 101 of the robotic system 100 when the hitch assembly 140 is being aligned with a height of a hitch receiver of a vehicle for purposes of coupling the robotic system 100 to the vehicle and/or when the robotic system 100 is coupled to a vehicle and raised off a ground surface, as will be described in greater detail herein.

Still referring to FIG. 3C, with the hitch assembly 140 translated along the track 182 to the lowest extent possible at the second hitching position (i.e., a minimum vertical height relative to the body 101), an elevation of the hitch assembly 140 may be fixedly secured by a locking mechanism 186 of the height adjustment mechanism 180. In particular, the locking mechanism 186 is positioned adjacent to the second hitching position along the track 182. As will be described in greater detail herein, securing the hitch assembly 140 at the second hitching position allows for an elevation of the robotic system 100 off a ground surface when the hitch assembly 140 is coupled to a hitch receiver of a vehicle. Accordingly, providing the locking mechanism 186 at the second hitching position allows the hitch assembly 140 to be securely fixed at the second hitching position, thereby ensuring the robotic system 100 is extended off a ground surface when a vehicle is driving.

Referring now to FIG. 4, and as briefly described above, the coupling end 141 is rotatably coupled to the elongated housing 142 at the pivot joint 143 such that the elongated housing 142 and the insertion end 148 are pivotable relative to the coupling end 141 of the hitch assembly 140. The elongated housing 142 further includes a pair of apertures 146 extending therethrough and positioned proximate to the insertion end 148. As briefly described above, the hollow interior of the elongated housing 142 is sized and shaped to enclose one or more coupling mechanisms therein between the coupling end 141 and the insertion end 148 of the hitch assembly 140. In particular, the hitch assembly 140 includes a coupling mechanism 150 sized and shaped to be received within the hollow interior 144 such that the coupling mechanism 150 is disposed within the elongated housing 142. The example coupling mechanism 150 of the hitch assembly 140 includes a pair of engagement pins 152, a pair of tabs 154, and a biasing mechanism 158 disposed between the pair of engagement pins 152 and the pair of tabs 154. In particular, each pin 152 of the pair of engagement pins 152 includes at least one tab 154 secured thereto such that the pair of engagement pins 152 are separated from one another by the pair of tabs 154 positioned therebetween. The biasing mechanism 158 is coupled to each tab 154 of the pair of tabs 154 such that, with each pin 152 secured to at least one of the tabs 154, the biasing mechanism 158 is effectively coupled to the pair of engagement pins 152 via the pair of tabs 154 positioned therebetween.

The biasing mechanism 158 has a predetermined bias that is configured to exert a laterally outward force against the pair of tabs 154 such that the pair of engagement pins 152 are biased away from one another. With the coupling mechanism 150 disposed within the hollow interior 144 of the elongated housing 142 and the pair of engagement pins 152 aligned with the pair of apertures 146 of the elongated housing 142, the biasing mechanism 158 extends the pair of engagement pins 152 laterally outward from the elongated housing 142 through the pair of apertures 146. Each tab 154 of the pair of tabs 154 is disposed within the hollow interior 144 of the elongated housing 142. It should be understood that the biasing mechanism 158 may includes various systems capable of exerting a resilient force against the pair of engagement pins 152, including, for example, a spring, a coil, an elastic member, a resilient member, a torsional device, a helical clip, and/or the like.

Still referring to FIG. 4, the coupling mechanism 150 of the hitch assembly 140 further includes a cam feature 160 positioned over and coupled to the pair of tabs 154. In particular, the cam feature 160 includes a pair of inner sidewalls 162 and a pair of lateral walls 166 that collectively define an aperture 164 of the cam feature 160 positioned therebetween. Each tab 154 of the pair of tabs 154 includes a protrusion 156 extending relatively upward from the pair of tabs 154 such that the protrusion 156 of each of the pair of tabs 154 is received between the pair of inner sidewalls 162, and in particular within the aperture 164 of the cam feature 160. In other words, with the protrusions 156 of the pair of tabs 154 extending into the aperture 164 of the cam feature 160 and abutting against the pair of inner sidewalls 162, the pair of tabs 154 is effectively coupled to the cam feature 160. The pair of inner sidewalk 162 of the cam feature 160 is tapered relative to the pair of lateral walls 166 such that the inner sidewalls 162 are angled inwardly toward one another at one end of the cam feature 160 (e.g., at an end positioned adjacent to the lateral wall 166 that is proximate to the insertion end 148 of the hitch assembly 140), and angled outwardly away from one another at an opposite end of the cam feature 160 (e.g., at an end positioned adjacent to the opposing lateral wall 166 that is distal to the insertion end 148). As merely an illustrative example, each of the inner sidewalls 162 may be angled relative to a longitudinal length of the lateral walls 166 within a range of about 1 degree to about 89 degrees.

As briefly described above, the hitch assembly 140 includes a sensor array 230 disposed thereon in some embodiments. More specifically, the hitch assembly 140 includes a sensor array 230 disposed on the insertion end 148 of the hitch assembly 140 such that the hitch assembly 140 includes one or more sensors 232. The one or more sensors 232 of the sensor array 230 may include one or more imaging devices, including cameras, optical sensors, ranging systems, time of flight (TOF) sensors, proximity sensing systems, laser emitting devices, and/or the like. Additionally or alternatively, the one or more sensors 232 on the hitch assembly 140 may include a load cell, force sensing resistor, pressure transducer, a variable resistor pressure switch, and/or the like. In this instance, the one or more sensors 232 are configured to detect a contact force and/or pressure applied to the insertion end 148 of the hitch assembly 140 by an external object, such as, for example, a hitch receiver of a vehicle. As will be described in greater detail herein, the one or more sensors 232 of the hitch assembly 140 is operable to transmit data. via an electrical signal. indicative of an angular misalignment of the hitch assembly 140 to a vehicle hitch receiver to facilitate an autonomous alignment and receipt of the insertion end 148 into a hitch receiver to thereby securely couple the robotic system 100 to a vehicle. It should be understood that in other embodiments the sensor array 230 of the hitch assembly 140 may include additional and/or fewer sensors 232 disposed thereon and at various other locations than those shown and described herein without departing from a scope of the present disclosure.

Still referring to FIG. 4, the hitch assembly 140 is generally shaped and sized relatively smaller than a hitch receiver of a vehicle 10 such that a gap may be formed between the hitch assembly 140 and a hitch receiver when the hitch assembly 140 is received therein in some embodiments. In this instance, the hitch assembly 140 may include one or more mechanical expanders 145 positioned along the elongated housing 142 of the hitch assembly 140, and in particular between the insertion end 148 and the coupling end 141 of the hitch assembly 140. The one or more mechanical expanders 145 are configured to extend outwardly from the elongated housing 142 to increase a cross-sectional area of the hitch assembly 140. In other words, the one or more mechanical expanders 145 are operable to transition from a collapsed state to an expanded state to seal and/or engage the hitch assembly 140 to a hitch receiver and securely couple the robotic system 100 to a vehicle. It should be understood that in other embodiments the hitch assembly 140 may include additional and/or fewer mechanical expanders 145 disposed along the elongated housing 142 and at various other locations than those shown and described herein without departing from a scope of the present disclosure.

The cam feature 160 is sized and shaped to be received within the hollow interior 144 of the elongated housing 142. In the present example, the cam feature 160 is sized with a length of approximately 30 millimeters, a width of approximately 30 millimeters, and a height of approximately 10 millimeters. It should be understood that the cam feature 160 may include various other sizes and/or shapes than that described and shown herein. Additionally, as described in greater detail below, the coupling mechanism 150 disposed within the hitch assembly 140 may include various other forms than that of a cam feature, such as, for example, a pin actuator (FIG. 6), a pulley mechanism (FIG. 7), and/or the like. As will be described in greater detail herein, the protrusion 156 of each of the tabs 154 engages the pair of inner sidewalls 162 when received within the aperture 164 of the cam feature 160. Accordingly, the pair of protrusions 156 includes surfaces that are shaped and sized to correspond with the tapered surface of the pair of inner sidewalls 162 (FIGS. 5A-5B).

Figure 5A:
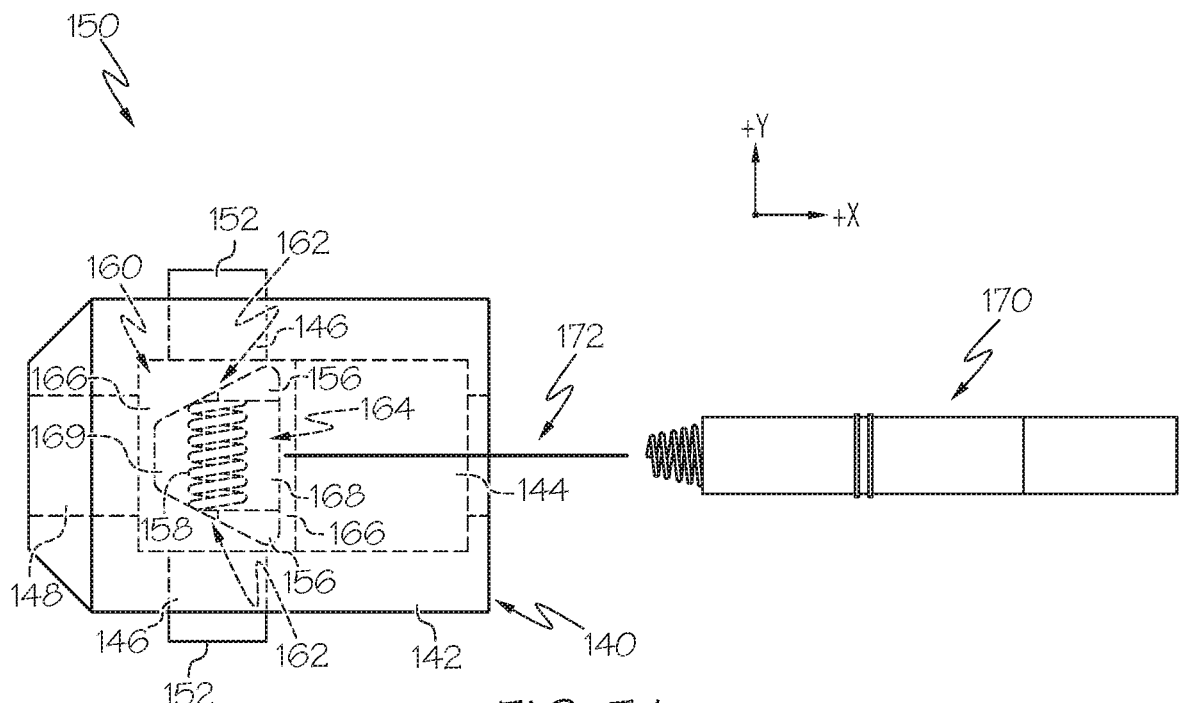
FIG. 5A schematically depicts the hitch assembly of FIG. 1 with the pair of engagement pins in an extended state according to one or more embodiments shown and described herein.
Figure 5B:
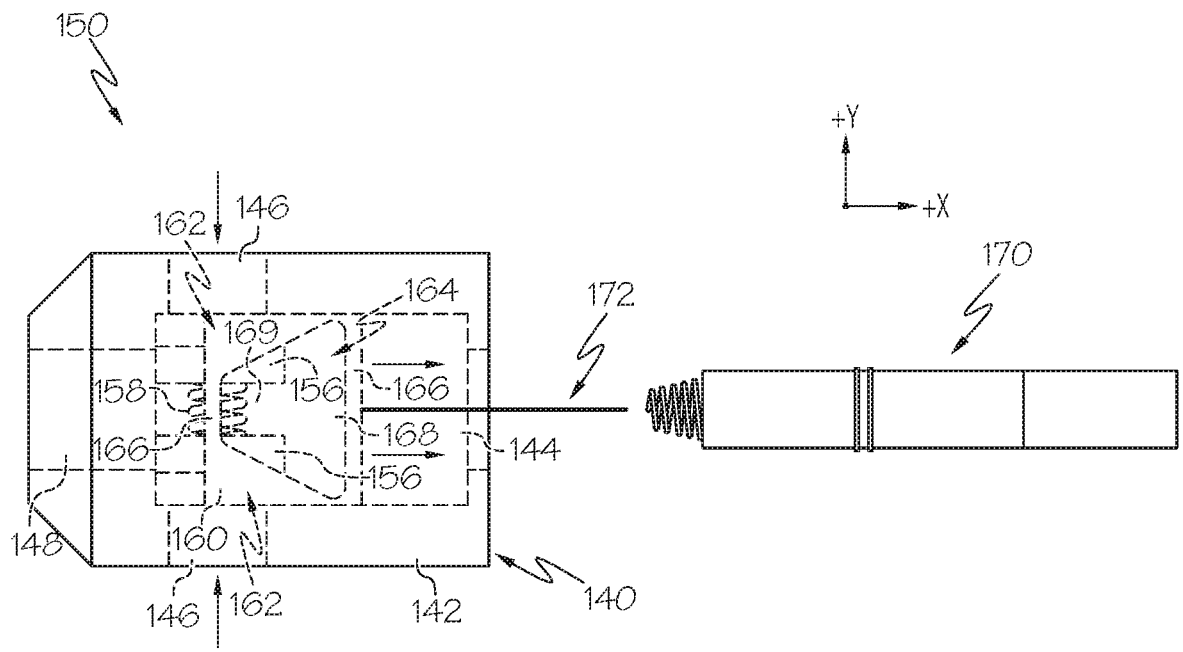
FIG. 5B schematically depicts the hitch assembly of FIG. 1 with the pair of engagement pins in a retracted state according to one or more embodiments shown and described herein.

Referring now to FIGS. 5A-5B, the aperture 164 of the cam feature 160 is depicted including a widened region 168 formed between the pair of inner sidewalls 162 where the inner sidewalk 162 include the greatest distance between one another. The aperture 164 of the cam feature 160 further includes a narrowed region 169 between the pair of inner sidewalls 162 where the inner sidewalls 162 include the least distance between one another. Accordingly, it should be understood that the size and shape of the aperture 164 varies along a longitudinal length of the cam feature 160 due to the relatively tapered and/or angled orientation of the pair of inner sidewalls 162. In some embodiments, the pair of engagement pins 152, the pair of tabs 154, and/or the cam feature 160 of the coupling mechanism 150 may be formed of steel, aluminum, and/or the like. In some embodiments, each engagement pin 152 of the pair of engagement pins 152 is sized to have a diameter of approximately 0.625 inches, however, it should be understood that the pair of engagement pins 152 may include various other sizes and/or shapes.

Referring specifically to FIG. 5A, with the biasing mechanism 158 exerting a bias against the pair of tabs 154 and the pair of engagement pins 152, the protrusions 156 of the pair of tabs 154 are translated along the pair of inner sidewalls 162 to an extent where the protrusions 156 are located along the widened region 168 of the aperture 164. In this instance, the tabs 154 are separated from one another by the biasing mechanism 158 to the furthest extent possible such that the pair of tabs 154 are extended laterally outward and engage an interior surface of the elongated housing 142 (FIG. 5A). With the biasing mechanism 158 extended to the furthest extent possible and the pair of engagement pins 152 aligned with the pair of apertures 146 of the elongated housing 142, the pair of engagement pins 152 extend through the pair of apertures 146 and outward from the elongated housing 142. As will be described in greater detail herein, compression of the biasing mechanism 158 provides for the retraction of the pair of engagement pins 152 such that the pair of engagement pins 152 are withdrawn from extending through the pair of apertures 146 of the elongated housing 142 (FIG. 5B). In this instance, the pair of tabs 154 is withdrawn inwardly into the hollow interior 144 and disengaged from an interior surface of the elongated housing 142.

The cam feature 160 is depicted being coupled to an actuation mechanism 170 along one of the lateral walls 166 via a connecting rod and/or cable 172. The actuation mechanism 170 is operable to actuate the cam feature 160, and in particular, to translate the cam feature 160 within the hollow interior 144 of the elongated housing 142. The actuation mechanism 170 may include various forms, including, for example, a motor, a solenoid, and/or the like. In other embodiments, the actuation mechanism 170 is coupled to the cam feature 160 by one or more gears, a lead screw, and/or the like, such that rotation of the gears and/or lead screw, as caused by the actuation mechanism 170, provides for the translation of the cam feature 160. In the present example depicted in FIGS. 5A-5B, the actuation mechanism 170 includes a solenoid. It should be understood that in some embodiments a manual actuator may be included with the hitch assembly 140 and coupled to the cam feature 160, in conjunction with the actuation mechanism 170, as a secondary release for instances where manually translating the cam feature 160 is necessary. It should also be understood that in other embodiments the actuation mechanism 170 and the cam feature 130 may be integrated. For example, the actuation mechanism 170 may be an electric motor (e.g., a servo motor) coupled to the cam feature 130 that rotates and causes the cam feature 130 to translate. In such embodiments, the cam feature 130 may be directly coupled to the actuation mechanism 170 and therefor there is no connecting cable 172 provided.

Referring still to FIG. 5A, with the actuation mechanism 170 in a deactivated state, the biasing force generated by the biasing mechanism 158 is unimpeded such that the biasing mechanism 158 exerts a laterally outward force against the pair of engagement pins 152 and the pair of tabs 154, thereby causing the cam feature 160 to translate toward the insertion end 148 of the hitch assembly 140. In other words, the biasing mechanism 158 pushes the pair of tabs 154 laterally outward relative to the elongated housing 142 such that the pair of tabs 154 translate along the pair of inner sidewalls 162 until the pair of protrusions 156 are positioned within the aperture 164 at the widened region 168 (i.e., a maximum separation extent between the pair of inner sidewalls 162).

It should be understood that the pair of protrusions 156 of the pair of tabs 154 are positioned along the widened region 168 of the aperture 164 when the coupling mechanism 150 is in a default state without a force countering a bias generated by the biasing mechanism 158. In this instance, with the coupling mechanism 150 in a default state, the pair of engagement pins 152 are in a fully extended positioned such that the pair of engagement pins 152 extend through the pair of apertures 146 of the elongated housing 142 and thereby extend outwardly from the elongated housing 142. As will be described in greater detail herein, with the pair of engagement pins 152 in a fully extended position when the hitch assembly 140 is received within an object, the pair of engagement pins 152 may be received in a pair of corresponding apertures of the object thereby coupling the hitch assembly 140 to the object. That is, the pair of engagement pins 152 are positively locked when received within the pair of corresponding apertures of the object. In some embodiments, the object includes a hitch receiver of a vehicle such that the coupling mechanism 150 effectively secures the robotic system 100 to the vehicle. Accordingly, the coupling mechanism 150 of the hitch assembly 140 provides an automatic means to lock the robotic system 100 to the vehicle without requiring manual control and/or physical involvement from an operator.

Referring now to FIG. 5B, with the actuation mechanism 170 in an activated state, the actuation mechanism 170 provides for a counter force that overcomes a bias generated by the biasing mechanism 158. In particular, in embodiments where the actuation mechanism 170 includes a solenoid, the actuation mechanism 170 generates an electromagnetic force that is applied to the connecting cable 172, which is disposed between and coupled to the actuation mechanism 170 and the lateral wall 166 of the cam feature 160. In this instance, the electromagnetic force generated by the actuation mechanism 170 and transmitted to the connecting cable 172 causes the connecting cable 172 to pull the cam feature 160 by a predetermined translation force that is greater than a resilient bias exerted on the pair of engagement pins 152 by the biasing mechanism 158. In other words, the connecting cable 172 pulls the lateral wall 166 of the cam feature 160 such that the cam feature 160 translates toward the coupling end 141 of the hitch assembly 140. With the cam feature 160 translating within the hollow interior 144 of the elongated housing 142, the pair of inner sidewalk 162 simultaneously translate thereby causing the pair of protrusions 156 of the pair of tabs 154 to slidably engage the inner sidewalls 162. In embodiments that do not utilize the connecting cable 172, the actuation mechanism 170 applies a continuous force to the cam feature 130 directly.

As further seen in FIG. 5B, the pair of protrusions 156 are positioned along the narrowed region 169 of the aperture 164 due to the translation of the cam feature 160 and the corresponding compression of the biasing mechanism 158. Accordingly, the pair of engagement pins 152 are retracted inwardly toward one another relative to the elongated housing 142 and are withdrawn from the pair of apertures 146 of the elongated housing 142. As will be described in greater detail herein, with the pair of engagement pins 152 in a fully retracted position when the hitch assembly 140 is received within an object, the pair of engagement pins 152 may be removed from a pair of corresponding apertures of the object thereby decoupling the hitch assembly 140 from the object. In embodiments where the object includes a hitch receiver of a vehicle, removal of the pair of engagement pins 152 from a pair of corresponding apertures of the hitch receiver provides for a disengagement of the robotic system 100 from the vehicle. Accordingly, the coupling mechanism 150 of the hitch assembly 140 provides an automatic means to unlock the robotic system 100 from a vehicle without requiring manual control and/or physical involvement from an operator.

Figure 6A:
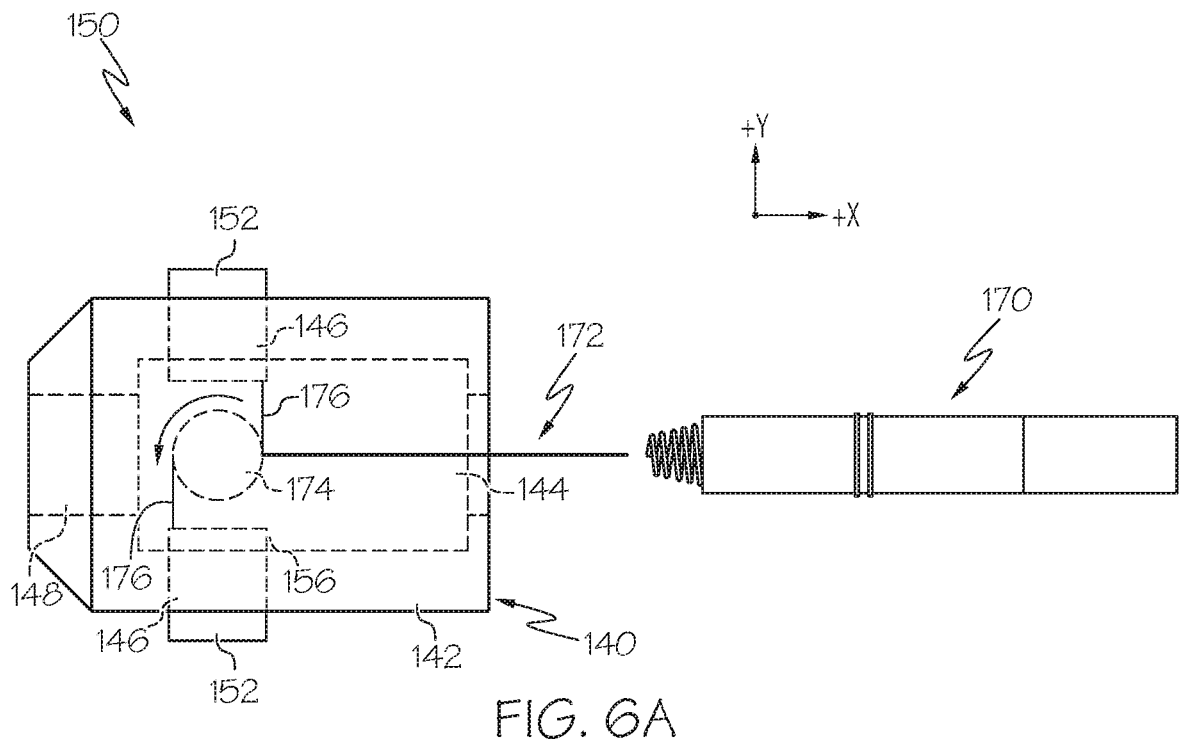
FIG. 6A schematically depicts another illustrative hitch assembly including a central pin actuator with the pair of engagement pins in an extended state according to one or more embodiments shown and described herein.
Figure 6B:
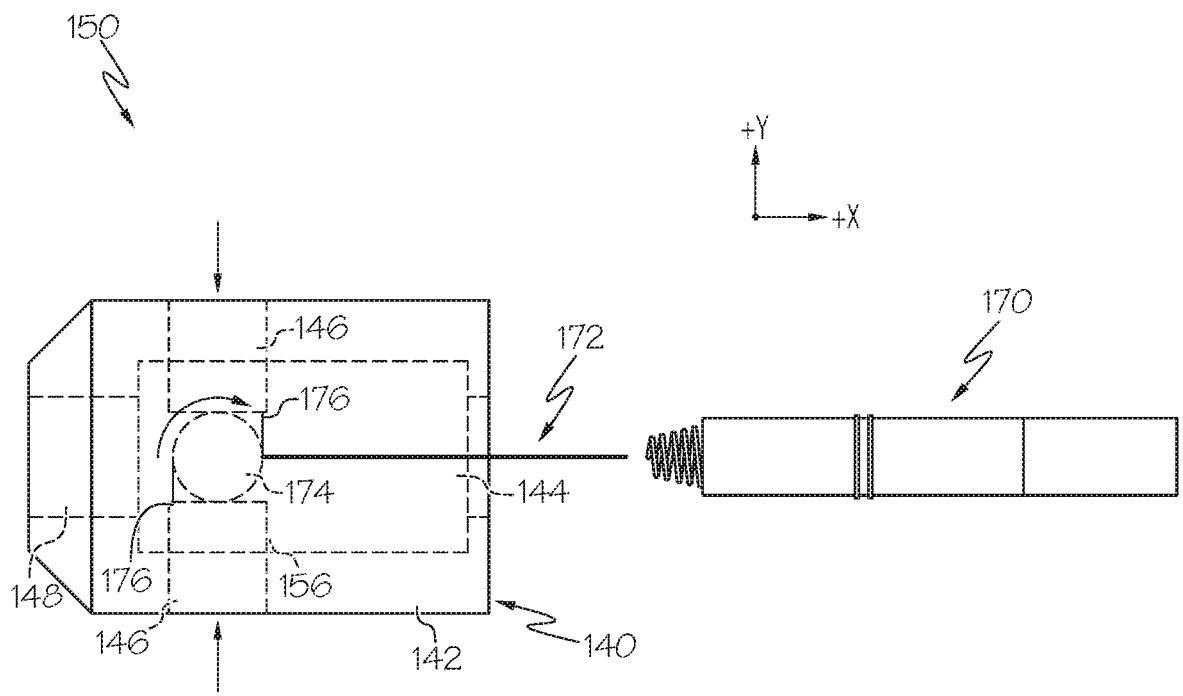
FIG. 6B schematically depicts the hitch assembly of FIG. 4A with the pair of engagement pins in a retracted state according to one or more embodiments shown and described herein.

Referring to FIGS. 6A-6B, and as briefly described above, the coupling mechanism of the hitch assembly 140 may include various other features and/or forms other than the cam feature 160 shown and described herein. For example, the coupling mechanism 150 may include a central pin actuator 174 that is disposed between and secured to the pair of engagement pins 152 via a pair of cables 176. The central pin actuator 174 is further coupled to the actuation mechanism 170 via the connecting cable 172 such that a force generated by the actuation mechanism 170 (e.g., an electromagnetic force) and applied to the connecting cable 172 thereby causes the connecting cable 172 to exert a rotational force upon the central pin actuator 174. It should be understood that the actuation mechanism 170 and the central pin actuator 174 may be integrated. For example, the actuation mechanism 170 may be an electric motor (e.g., a servo motor) coupled to the central pin actuator 174 that rotates and causes the central pin actuator 174 to rotate. In such embodiments, the central pin actuator 174 may be directly coupled to the actuation mechanism 170 and therefor there is no connecting cable 172 provided.

As further described herein, the central pin actuator 174 rotates within the hollow interior 144 of the elongated housing 142, thereby providing for a translation of the pair of cables 176 coupled thereto. Although the pair of cables 176 are shown and described herein as being directly coupled to the pair of engagement pins 152, it should be understood that in other embodiments the pair of cables 176 may alternatively be coupled to the pair of tabs 154 which are further secured to the pair of engagement pins 152, as shown and described above with respect to FIGS. 5A-5B. In that instance, translation of the pair of cables 176 provides for the simultaneous translation of the pair of tabs 154 and the pair of engagement pins 152.

Referring now to FIG. 6A, rotation of the central pin actuator 174 in a first direction (e.g., counterclockwise direction) may provide for an outward translation of the pair of cables 176 relative to the central pin actuator 174 and/or the hollow interior 144 of the elongated housing 142. In this instance, the cables 176 exert an outward force upon the pair of engagement pins 152 such that the cables 176 push the pair of engagement pins 152 laterally outward away from the central pin actuator 174 and through the pair of apertures 146 of the elongated housing 142. The actuation mechanism 170 may maintain the pair of engagement pins 152 in the extended state shown in FIG. 6A by continuously applying a force (e.g., an electromagnetic force) to the connecting cable 172, which thereby provides a constant rotational force applied to the central pin actuator 174 by the connecting cable 172 (e.g., in the counterclockwise direction) to maintain a position of the pair of engagement pins 152 through the pair of apertures 146. In embodiments that do not utilize the connecting cable 172, the actuation mechanism 170 applies a continuous force to the central pin actuator 174 directly.

Referring now to FIG. 6B, rotation of the central pin actuator 174 in an opposite, second direction (e.g., clockwise direction) may provide for an inward translation of the cables 176 relative to the central pin actuator 174 and/or the hollow interior 144 of the elongated housing 142. In this instance, the cables 176 pull the pair of engagement pins 152 laterally inward toward the central pin actuator 174 and into the hollow interior 144 of the elongated housing 142 such that the pair of engagement pins 152 do not extend through the pair of apertures 146. The actuation mechanism 170 may maintain the pair of engagement pins 152 in the retracted state shown in FIG. 6B by continuously applying a force to the connecting cable 172, which thereby provides a constant rotational force applied to the central pin actuator 174 by the connecting cable 172 (e.g., in the clockwise direction) to maintain the pair of engagement pins 152 within the hollow interior 144 of the elongated housing 142 and positioned out of the pair of apertures 146. It should be understood that the actuation mechanism 170 of the present example may include various devices or systems as described in greater detail above, including, for example, a solenoid as depicted herein.

Figure 7A:
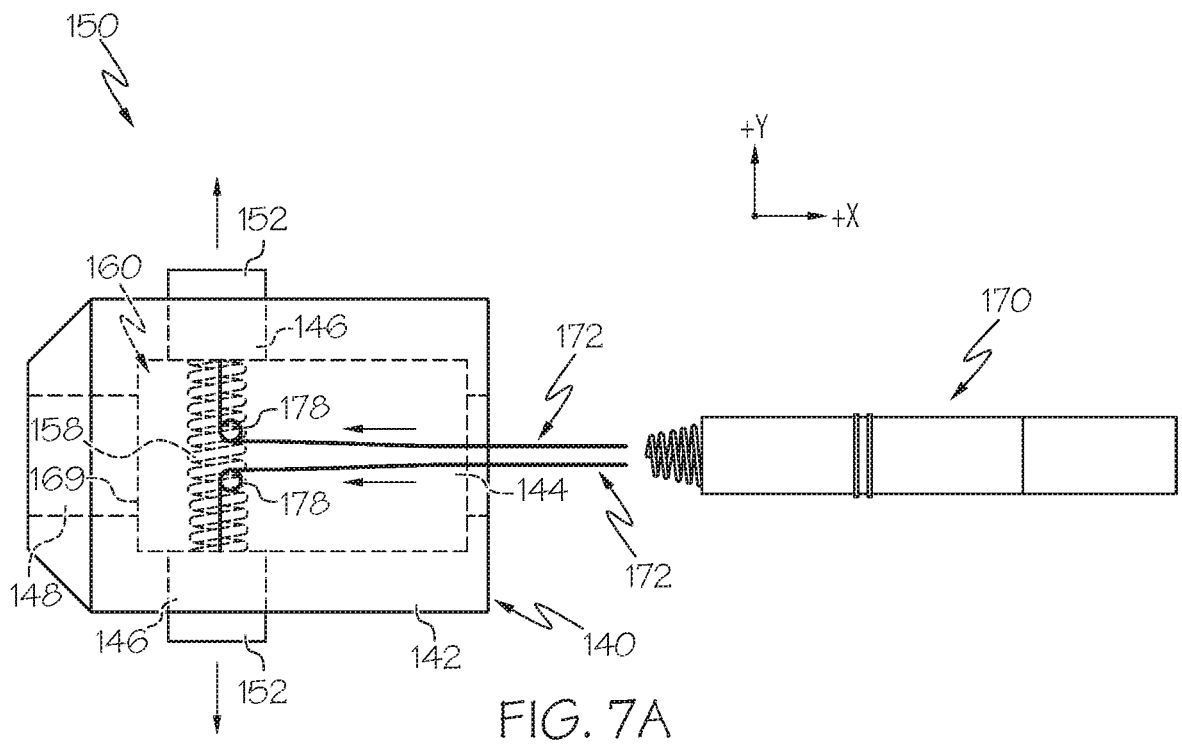
FIG. 7A schematically depicts another illustrative hitch assembly including a pair of pulleys with the pair of engagement pins in an extended state according to one or more embodiments shown and described herein.
Figure 7B:
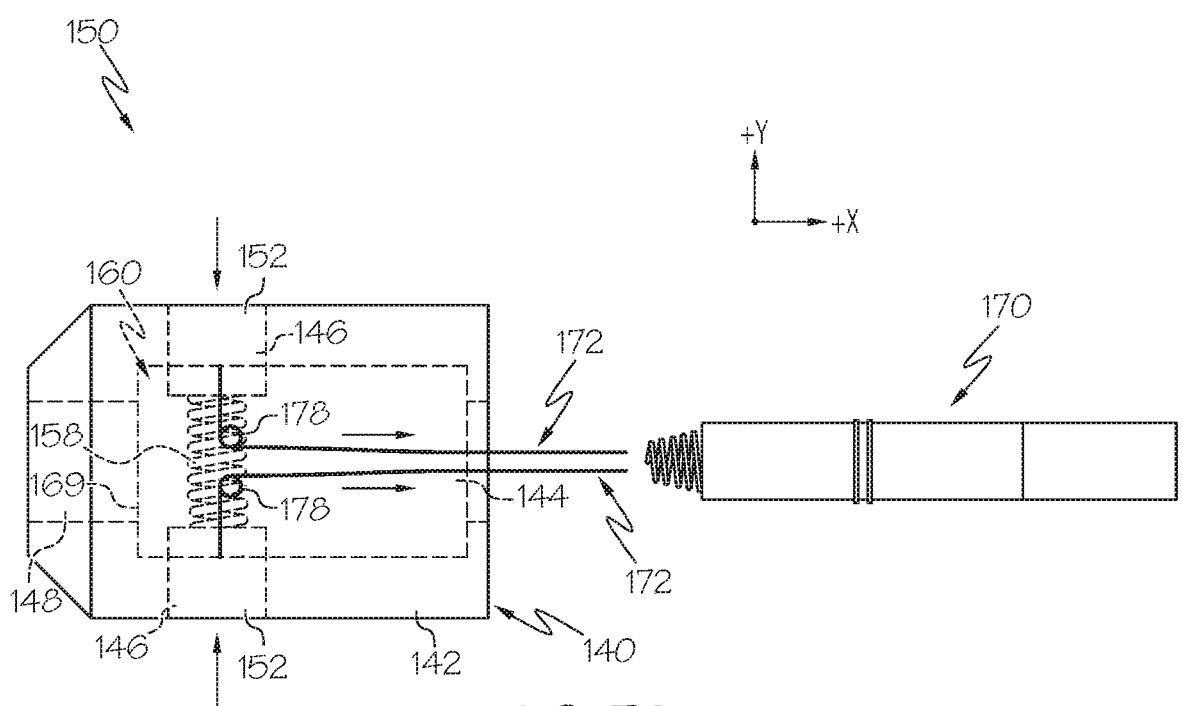
FIG. 7B schematically depicts the hitch assembly of FIG. 5A with the pair of engagement pins in a retracted state according to one or more embodiments shown and described herein.

Referring now to FIGS. 7A-7B, in other embodiments the coupling mechanism 150 may include one or more pulleys and cables disposed between and coupled to the pair of engagement pins 152. As described in greater detail herein, the one or more pulleys provide a mechanism for translating the pair of engagement pins 152 laterally relative to the hollow interior 144 (i.e., perpendicular to a longitudinal length of the elongated housing 142) in response to a translational force that is perpendicular to the movement (i.e., translation) of the engagement pins 152 (i.e., parallel to a longitudinal length of the elongated housing 142).

In the present example, the coupling mechanism 150 may include a pair of pulleys 178 that are disposed within the hollow interior 144 of the elongated housing 142 between the pair of engagement pins 152. In particular, the pair of pulleys 178 are disposed between the engagement pins 152 and within the biasing mechanism 158 of the coupling mechanism 150. However, it should be understood that the pulleys 178 may be positioned between the pair of engagement pins 152 at various other locations within the hollow interior 144 of the elongated housing 142. The pair of pulleys 178 are fixedly secured to an interior surface of the elongated housing 142 such that the pulleys 178 are immovable relative to the hollow interior 144 of the elongated housing 142.

The pair of connecting cables 172 is coupled to the pair of engagement pins 152 along an opposite end than the actuation mechanism 170. Further, the pair of connecting cables 172 extend about and are slidably engaged to the pair of pulleys 178 between the pair of engagement pins 152 and the actuation mechanism 170. In other words, the pair of connecting cables 172 are coupled to the actuation mechanism 170 and the pair of engagement pins 152 about the pair of pulleys 178 such that movement of the pair of connecting cables 172 between the actuation mechanism 170 and the engagement pins 152 provides for a translation of the connecting cables 172 along the pair of pulleys 178. As will be described in greater detail herein, the pair of connecting cables 172 translate against and/or along the pair of pulleys 178 to thereby move the pair of engagement pins 152 relative to the pair of apertures 146 in response to actuation of the actuation mechanism 170. The pair of pulleys 178 provide for a directional transition for translating the pair of connecting cables 172 relative to the hollow interior 144 of the elongated housing 142.

Referring specifically to FIG. 7A, the pair of engagement pins 152 is depicted in the extended state relative to the pair of apertures 146 of the elongated housing 142. In this instance, a force generated by the actuation mechanism 170 and/or applied to the pair of connecting cables 172 is omitted such that a resilient bias of the biasing mechanism 158 exerts a laterally outward force against the pair of engagement pins 152 relative to the hollow interior 144 of the elongated housing 142. With the actuation mechanism 170 not applying a counter force to the pair of connecting cables 172 against the lateral force generated by the biasing mechanism 158 and applied to the pair of engagement pins 152, the connecting cables 172 translate toward the insertion end 148 within the hollow interior 144 of the elongated housing 142. With each of the connecting cables 172 slidably coupled to one of the pulleys 178 and secured to one of the engagement pins 152, each of the connecting cables 172 slidably translate about the pulleys 178 as the pair of engagement pins 152 pull the connecting cables 172 in response to the biasing mechanism 158 exerting a laterally outward translation force on the engagement pins 152.

Although the pair of connecting cables 172 are shown and described herein as being directly coupled to the pair of engagement pins 152, it should be understood that in other embodiments the connecting cables 172 may alternatively be coupled to the pair of tabs 154 which are further secured to the pair of engagement pins 152, as shown and described above with respect to FIGS. 5A-5B. In that instance, translation of the pair of tabs 154 in response to the bias of the biasing mechanism 158 disposed therebetween provides for the simultaneous translation of the connecting cables 172 within the hollow interior 144 and in a direction toward the insertion end 148.

Referring now to FIG. 7B, the pair of engagement pins 152 is depicted in the retracted state relative to the pair of apertures 146 of the elongated housing 142. In this instance, a force is generated by the actuation mechanism 170 (e.g., a solenoid) and applied to the pair of connecting cables 172 which thereby causes the pair of connecting cables 172 to translate distally relative to the insertion end 148 of the elongated housing 142. In this instance, with the pair of connecting cables 172 secured to the pair of engagement pins 152, translation of the connecting cables 172 distally from the insertion end 148 provides for the simultaneous translation of the engagement pins 152 inward into the hollow interior 144. In other words, the pair of connecting cables 172 pull the engagement pins 152 laterally inward such that the pair of engagement pins 152 are retracted from the apertures 146.

In particular, the translational force applied to the pair of engagement pins 152 by the connecting cables 172 is greater than a resilient bias of the biasing mechanism 158, which generates a laterally outward force exerted against the pair of engagement pins 152. Accordingly, the lateral force of the biasing mechanism 158 applied to the pair of engagement pins 152 is overcome by the translational pulling force applied to the pair of engagement pins 152 by the connecting cables 172. With the actuation mechanism 170 generating a force (e.g., an electromagnetic force) that is applied to the pair of connecting cables 172 and counters the force generated by the biasing mechanism 158, the connecting cables 172 translate within the hollow interior 144 of the elongated housing 142 away from the insertion end 148 thereby simultaneously pulling the engagement pins 152 inward.

With each of the connecting cables 172 slidably coupled to one of the pulleys 178 and secured to one of the engagement pins 152, each of the connecting cables 172 slidably translate about the pulleys 178 as the pair of connecting cables 172 pull the pair of engagement pins 152 in response to the actuation mechanism 170 applying a force onto the cables 172 that is greater than the force applied to the engagement pins 152 by the biasing mechanism 158. It should be understood that the actuation mechanism 170 of the present example may include various devices or systems as described in greater detail above, including, for example, a solenoid as depicted herein.

Figure 8A:
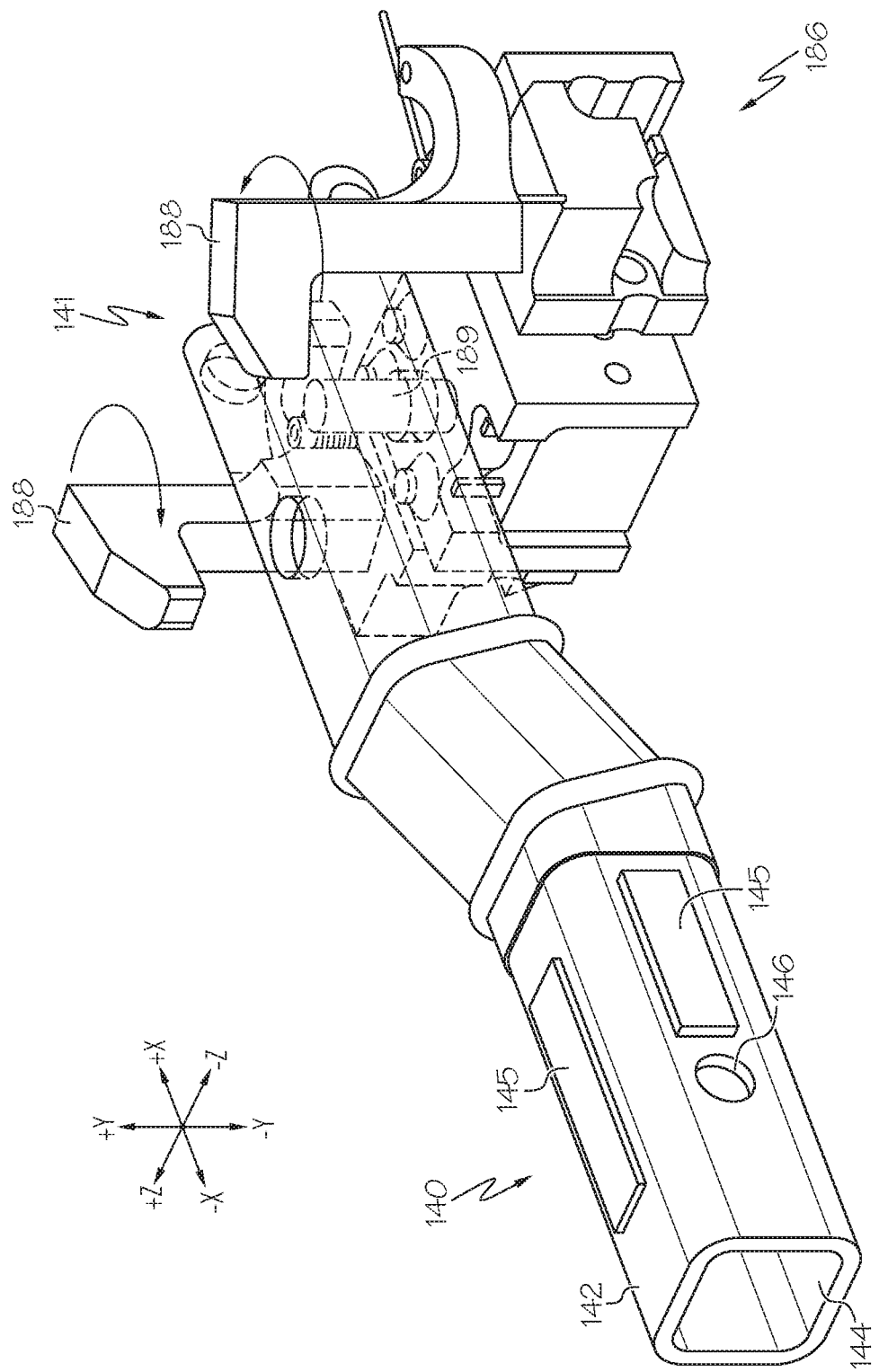
FIG. 8A schematically depicts a locking mechanism of the hitch assembly of FIG. 1 in an unlocked state according to one or more embodiments shown and described herein.

Referring now to FIG. 8A, an example locking mechanism 186 of the height adjustment mechanism 180 is depicted in an unlocked state. The locking mechanism 186 includes a pair of rotatable pawls 188 and a support pin 189. The pair of rotatable pawls 188 may be formed of various materials, including, for example, metal alloys and are configured to rotate in response to actuation of an actuator. It should be understood that the actuator may include various other forms, including, for example, a motor, a spring mechanism, and/or the like. In the present example, the pair of rotatable pawls 188 are coupled to both a solenoid and a spring such that the pair of rotatable pawls 188 are rotatable to an unlocked configuration in response to actuation of the solenoid, as seen in FIG. 8A. In particular, the pair of rotatable pawls 188 is rotated outwardly to an unlocked state in response to the solenoid generating an electromagnetic force that is applied to each of the rotatable pawls 188, which thereby generates a predetermined rotational force that is greater than a resilient bias exerted on the pair of rotatable pawls 188 by the spring.

With the pair of rotatable pawls 188 rotated to the unlocked state, the hitch assembly 140 may be translated through the track 182 toward the second position (FIG. 3C) and received at the lowest end of the track 182 adjacent to the locking mechanism 186. In this instance, the hitch assembly 140, and in particular the elongated housing 142, is slidably received over the support pin 189 of the locking mechanism 186. The support pin 189 extends vertically upward (i.e., parallel with a longitudinal length of the body 101) and engages the elongated housing 142 when the hitch assembly 140 is received at the second position. It should be understood that the elongated housing 142 may include an aperture along a bottom surface of the elongated housing 142, adjacent to the coupling end 141, which is sized and shaped to receive the support pin 189 therein. The support pin 189 partially secures the hitch assembly 140 to the locking mechanism 186, and in particular inhibits lateral movement of the hitch assembly 140 with the support pin 189 received through the hollow interior 144 of the elongated housing 142.

Figure 8B:
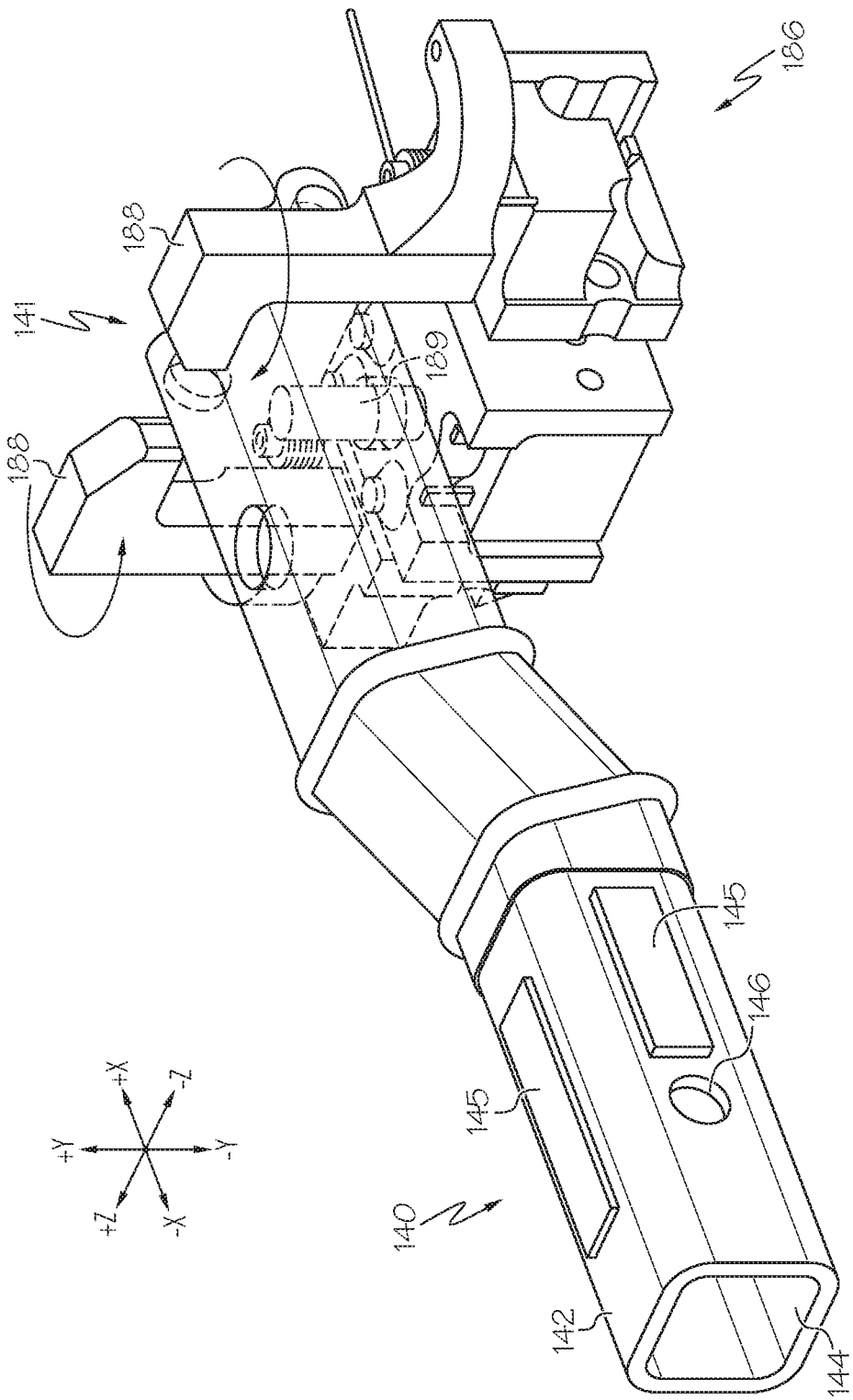
FIG. 8B schematically depicts a locking mechanism of the hitch assembly of FIG. 1 in a locked state according to one or more embodiments shown and described herein.

Referring now to FIG. 8B, with the hitch assembly 140 translated to the second position along the track 182 and received over the support pin 189, the actuator assembly 184 (e.g., a solenoid) terminates the electromagnetic force applied to the pair of rotatable pawls 188 such that a resiliently bias of the spring exerts a rotational force onto the pair of rotatable pawls 188, thereby transitioning the pair of rotatable pawls 188 to a locked state. In this instance, the pair of rotatable pawls 188 is positioned relatively over the elongated housing 142 of the hitch assembly 140 such that the hitch assembly 140 is inhibited from translating upward along the track 182 due to the engagement of the rotatable pawls 188 onto an upper surface of the elongated housing 142. In other embodiments, the pair of rotatable pawls 188 of the locking mechanism 186 may be actuated via various other devices and/or systems other than the spring described above. It should be understood that with the hitch assembly 140 engaged against the metal surfaces of the pair of rotatable pawls 188 when in the locked state, the pair of rotatable pawls 188 are configured to minimize a strain imposed on the actuator assembly 184 of the height adjustment mechanism 180. Additionally, it should be understood that the locking mechanism 186 of the robotic system 100 may include various other forms than those shown and described herein for securely fastening a position of the hitch assembly 140 relative to the body 101 without departing from the scope of the present disclosure.

It should be understood that the configuration of the hitch assembly 140 and the height adjustment mechanism 180 may include various other arrangements that those shown and described above. By way of example, and referring now to FIG. 9, a hitch assembly 140' and a height adjustment mechanism 180' may include an opposite configuration than that described above and depicted in FIGS. 3A-3C in that the hitch assembly 140' extends laterally outward from the body 101 as the hitch assembly 140' translates upward along an alternate track 185 (rather than retracting inward into the body 101 as the hitch assembly 140 translates upward as shown in FIG. 3A). Further, the hitch assembly 140' is retracted laterally inward toward and into the body 101 as the hitch assembly 140' translates downward along the alternate track 185 (rather than extending outward from the body 101 as the hitch assembly 140 translates downward as shown in FIG. 3B).

In this example, it should be understood that the hitch assembly 140' and the height adjustment mechanism 180' include substantially similar components as those described above and depicted in FIGS. 2-3 but for the travel path defined by the alternate track 185 relative to the track 182 of FIGS. 2-3. In particular, the opposite configuration is attributed to the alignment of a linear segment 181' and a nonlinear segment 183' of the alternate track 185 in contrast to the track 182 (FIGS. 2-3). In the embodiment depicted in FIGS. 2-3, the nonlinear segment 183 of the track 182 is positioned relatively above the linear segment 181 such that the hitch assembly 140 rotates upward into the body 101 when in the retracted state (FIG. 3B) and rotates downward out of the body 101 when in the hitching position (FIG. 3C). In the present embodiment, the hitch assembly 140' rotates downward into the body 101 when the pair of pins 149 translate upward along the alternate track 185 from the nonlinear segment 183' to the linear segment 181'. Accordingly, it should be understood that a location of the nonlinear segment 183, 183' relative to the linear segment 181, 181' of the tracks 182, 185 provides for a rotation of the hitch assembly 140, 140' relative to the body 101 when transitioning the hitch assembly 140, 140' from the stowed position to the hitching position.

Figure 9:
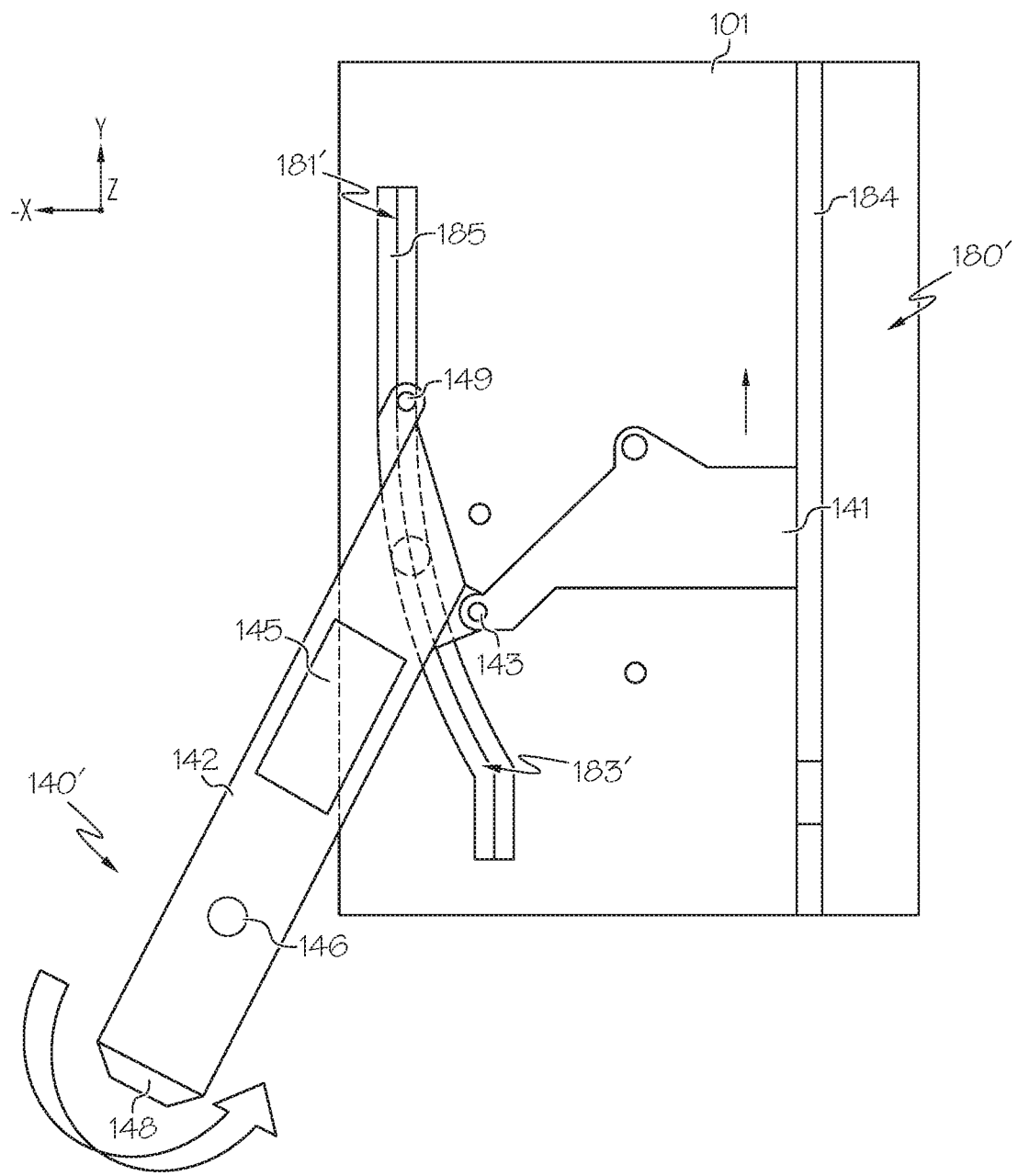
FIG. 9 schematically depicts an alternative hitch assembly according to one or more embodiments shown and described herein.

Still referring to FIG. 9, in the present example including the alternate track 185, the linear segment 181' is positioned relatively above the nonlinear segment 183' in a system vertical direction (i.e., along the +Y/−Y axis of the coordinate axes of FIG. 9) such that the hitch assembly 140' rotates downward into the body 101 when in the stowed position and upward out of the body 101 when in the hitching position. It should be understood that the configuration of the tracks 182, 185, and in particular a location of the linear segment 181, 181' and/or the nonlinear segment 183, 183' may include various other arrangements that those shown and described herein. In addition to a configuration of the track 182, 185, an arrangement of the pivot joint 143 of the hitch assembly 140, 140' relative to the pair of pins 149 is determinative of a corresponding movement (i.e. retraction and extension) of the hitch assembly 140, 140' when transitioning between a stowed state and a hitching state, respectively. In the present example, the pivot joint 143 of the hitch assembly 140' is positioned relatively below the pair of pins 149 such that the elongated housing 142 pivots downwardly into the stowed state as the pair of pins 149 translate through the alternate track 185.

In contrast, the pivot joint 143 of the hitch assembly 140 shown in FIGS. 2-3 is positioned relatively above the pair of pins 149 received within the track 182, such that the elongated housing 142 pivots upwardly into the stowed state as the pair of pins 149 translate through the track 182. It should be understood that a configuration of the coupling end 141 of the hitch assembly 140, 140', and in particular a relative position of the pivot joint 143 and the pair of pins 149 of the hitch assembly 140, 140' may include various other arrangements that those shown and described herein without departing from the scope of the present disclosure. It should further be understood that the alternate track 185 provides for a compact storage of the hitch assembly 140' within the body 101 of the robotic system 100, in contrast to the track 182 described and shown above, as the elongated housing 142' of the hitch assembly 140' is stored along an interior space of the body 101 where the alternate track 185 extends rather than along a separate space within the body 101. In other words, additional space and/or a cavity within the body 101 is not required to stow the hitch assembly 140' in the present example of the height adjustment mechanism 180' including the alternate track 185 as the hitch assembly 140' transitions to the stowed position by rotating downward in a system vertical direction (i.e., along the +Y/−Y axis of the coordinate axes of FIG. 9) such that the elongated housing 142' extends along a length of the body 101 that includes a void for accommodating the alternate track 185.

Figure 10:
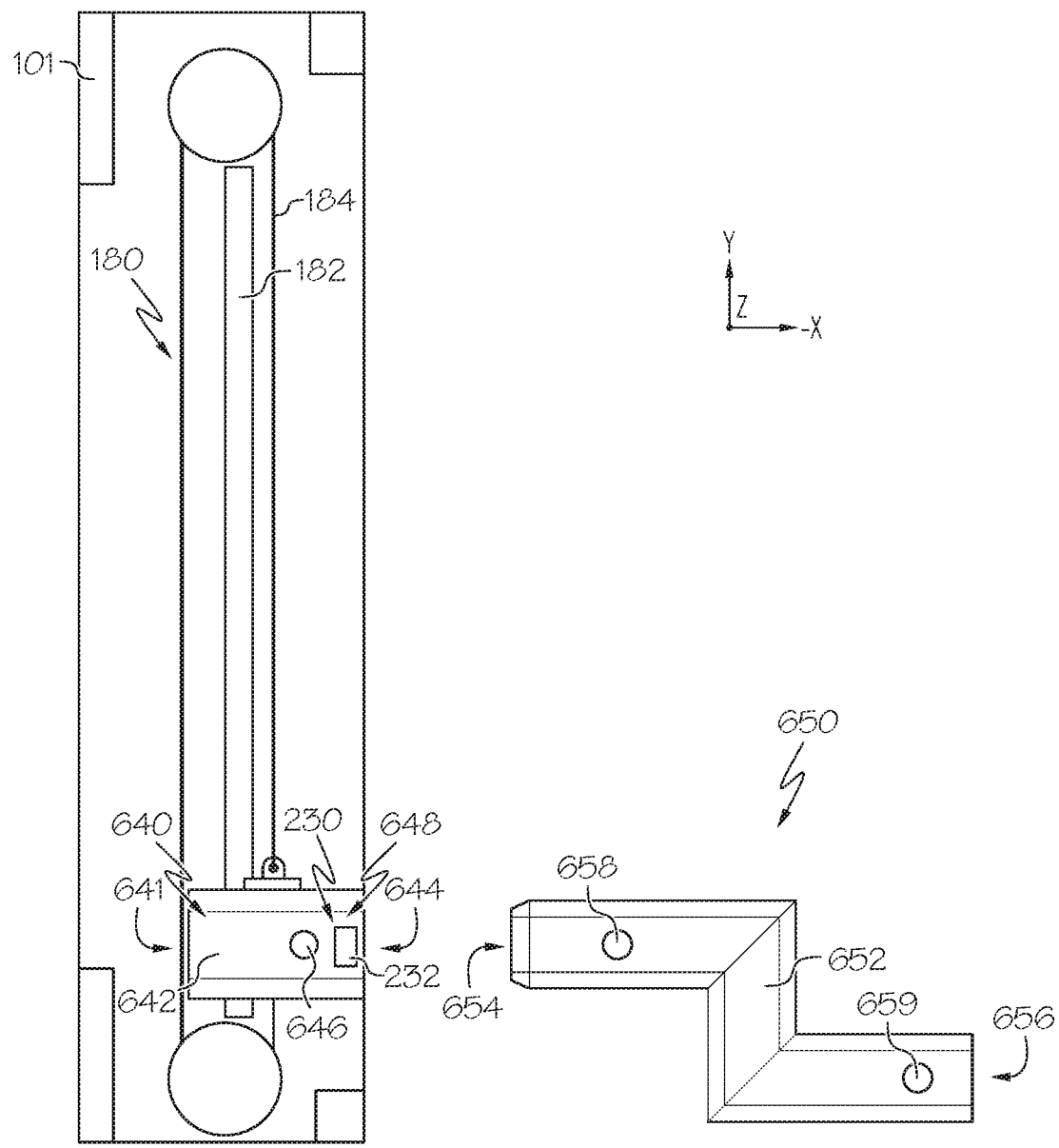
FIG. 10 schematically depicts an alternative hitch assembly according to one or more embodiments shown and described herein.

FIG. 10 depicts a non-limiting illustrative example of an alternative hitch assembly 640. The alternative hitch assembly 640 of the embodiment of FIG. 10 may be readily incorporated into the robotic system 100 described above such that like reference numerals for components of the robotic system 100 are used herein to identify like components. The hitch assembly 640 functions similar to hitch assemblies 140, 140' described above such that the hitch assembly 640 is operable to selectively couple the robotic system 100 to a hitch receiver of a vehicle. Accordingly, a version of the robotic system 100 that is equipped with the hitch assembly 640 of the present example may be configured similar to the robotic systems 100 described above except for the differences explicitly noted herein.

In the embodiment of FIG. 10, the hitch assembly 640 includes an elongated housing 642 defining a hollow interior 644 disposed therein. The elongated housing 642 includes a longitudinal length that extends between a coupling end 641 and a receiver end 648. The elongated housing 642 is disposed within the body 101 of the robotic system 100, and in particular, the coupling end 641 and the receiver end 648 of the hitch assembly 640 are fully disposed within the body 101 of the robotic system 100 such that the hitch assembly 640 does not extend outwardly from the body 101. In other words, the hitch assembly 640 remains disposed within the body 101 during both a stow position and a hitching position such that the hitch assembly 640 maintains a compact configuration relative to the hitch assemblies 140, 140' described and shown above.

The elongated housing 642 includes a pair of apertures 646 positioned between the coupling end 641 and the receiver end 648. It should be understood that the hitch assembly 640 may include one or more versions of the coupling mechanism 150 disposed within the hollow interior 644 as described and shown above, including, for example, the cam feature 160 (FIGS. 5A-5B), the central pin actuator 174 (FIGS. 6A-6B), the pair of cables 176 and pulleys 178 (FIGS. 7A-7B), and/or the like. However, unlike the hitch assemblies 140, 140' described and shown above (FIGS. 1-9), the elongated housing 642 of the hitch assembly 640 is not enclosed at an end opposite of the coupling end 641 (i.e., the receiver end 648), such that the hollow interior 644 of the elongated housing 642 remains exposed during use of the robotic system 100. As will be described in greater detail herein, the receiver end 648 is sized and shaped to receive a hitch receiver adapter 650 therethrough for purposes of coupling the robotic system 100 to a vehicle. The coupling end 641 of the hitch assembly 640 is coupled to the height adjustment mechanism 180 such that the hitch assembly 640 is translatable along the track 182 in a system vertical direction (e.g., along a +Y/−Y axes of FIG. 10) as similarly described and shown above with respect to hitch assembly 140 (FIGS. 2-3).

Still referring to FIG. 10, the hitch receiver adapter 650 is depicted in alignment with the hitch assembly 640. The hitch receiver adapter 650 includes a body 652 extending between an insertion end 654 and a coupling end 656. In the present example, the body 652 of the hitch receiver adapter 650 includes an irregular shape such that the insertion end 654 and the coupling end 656 extend along varying planes relative to a system vertical direction (e.g., along a +Y/−Y axes of FIG. 10). As will be described in greater detail herein, a shape and/or profile of the body 652 serves to extend the hitch receiver adapter 650 outwardly from a rear side of a vehicle, and in particular, from a vehicle hitch receiver. It should be understood that the body 652 of the hitch receiver adapter 650 may include various other shapes and/or sizes without departing from the scope of the present disclosure.

The hitch receiver adapter 650 further includes a first pair of apertures 658 positioned along the body 652 adjacent to the insertion end 654 and a second pair of apertures 659 positioned along the body 652 adjacent to the coupling end 656. Although not shown, it should be understood that the hitch receiver adapter 650 is sized and shaped to be removably attached to a hitch receiver of a vehicle, and in particular the coupling end 656 of the hitch receiver adapter 650 is configured to be received within and couple to a vehicle hitch receiver. In some embodiments, the receiver end 648 of the hitch assembly 640 may include a pivotable cap coupled thereto that is configured to seal the hollow interior 644 of the elongated housing 642 in instances when the hitch receiver adapter 650 is not received therein. Although not shown, it should be understood that the pivotable cap may be configured to autonomously move to thereby provide access to the hollow interior 644 of the elongated housing 642 for receipt of the insertion end 654 of the hitch receiver adapter 650 therethrough. In other embodiments, the pivotable cap may be pivotable into the hollow interior 644 of the elongated housing 642 in response to the insertion end 654 of the hitch receiver adapter 650 abutting against the pivotable cap when coupling with the hitch assembly 640.

Still referring to FIG. 10, the hitch receiver adapter 650 is coupled to a hitch receiver of a vehicle by slidably inserting the coupling end 656 of the body 652 into the hitch receiver when in use. For example, a coupling mechanism disposed within the body 652 of the hitch receiver adapter 650 and/or within a hitch receiver of a vehicle may securely fasten the hitch receiver adapter 650 to the hitch receiver by engaging the second pair of apertures 659 positioned along the coupling end 656. It should be understood that the coupling mechanism may include various devices and/or systems, including, for example, the coupling mechanisms described and shown herein (FIGS. 5-7). With the hitch receiver adapter 650 coupled to the hitch receiver and the body 652 extending outwardly from a rear side of the vehicle, the hitch assembly 640 may be operable to couple the robotic system 100 to the vehicle via the hitch receiver adapter 650.

In some embodiments, the hitch assembly 140 is pivotably and/or rotatably coupled to the robotic system 100 such that the elongated housing 642 is pivotable and/or rotatable within the body 101. For example, the hitch assembly 640 may include a gimbal (not shown) that is configured to pivotably support the hitch receiver adapter 650 received within the elongated housing 642. In this instance, with the hitch receiver adapter 650 coupled to the hitch assembly 640, the hitch assembly 640 is configured to selectively adjust an orientation of the hitch receiver adapter 650 relative to a physical arrangement of a hitch receiver of a vehicle relative to the body 101 of the robotic system 100 to thereby facilitate a coupling of the hitch receiver adapter 650 with the hitch receiver of the vehicle. Accordingly, a position and orientation of the hitch receiver adapter 650 may be selectively determined in accordance with a particular configuration of a hitch receiver of a vehicle from various possible sizes, shapes, and orientations of the hitch receiver for receiving the hitch receiver adapter 650 therein. It should be understood that the robotic system 100 of the present example, including the hitch assembly 640, may be operable to autonomously determine a trajectory plan to navigate the robotic system 100 toward the hitch receiver adapter 650 as described and shown herein with respect to FIGS. 13-14, to autonomously determine a motion control plane to move the hitch assembly 640 in alignment with the hitch receiver adapter 650 as described and shown herein with respect to FIGS. 16-16, and/or couple or decouple the hitch assembly 640 to the hitch receiver adapter 650 as described and shown herein with respect to FIGS. 16-17.

Still referring to FIG. 10, upon aligning the elongated housing 642 of the hitch assembly 640 with the insertion end 654 of the hitch receiver adapter 650 (e.g., by translating the hitch assembly 640 along the track 182 via the height adjustment mechanism 180), the receiver end 648 of the hitch assembly 640 receives the insertion end 654 of the hitch receiver adapter 650 therein by moving the body 101 toward a rear side of the vehicle. In some embodiments, the hitch assembly 640 may include a sensor array 230 disposed thereon. More specifically, the hitch assembly 640 may include one or more sensors 232 positioned within the elongated housing 642 between the coupling end 641 and the receiver end 648. The one or more sensors 232 of the sensor array 230 may include an imaging device (e.g., camera), a load cell, force sensing resistor, pressure transducer, a variable resistor pressure switch, and/or the like. For example, the one or more sensors 232 on the hitch assembly 640 are configured to detect a contact force and/or pressure applied to the receiver end 648 of the hitch assembly 640 by an external object, such as, for example, the insertion end 645 of the hitch receiver adapter 650. In this instance, the one or more sensors 232 of the hitch assembly 640 are operable to transmit data, via an electrical signal indicative of an angular misalignment of the hitch assembly 640 to the hitch receiver adapter 650 to facilitate an autonomous alignment and receipt of the insertion end 654 into the elongated housing 642 to thereby securely couple the robotic system 100 to the vehicle 10. It should be understood that in other embodiments the sensor array 230 of the hitch assembly 640 may include additional and/or fewer sensors 232 disposed thereon and at various other locations than those shown and described herein without departing from a scope of the present disclosure.

With the insertion end 654 of the hitch receiver adapter 650 received within the hollow interior 644 of the hitch assembly 640, the coupling mechanism 150 (see FIGS. 4-5) disposed within the elongated housing 642 is actuated to securely couple the hitch assembly 640 to the hitch receiver adapter 650 (e.g., by transitioning the pair of engagement pins 152 to an extended position to thereby extend the pins 152 outwardly through the pair of apertures 646 of the hitch assembly 640 and into the first pair of apertures 658 of the hitch receiver adapter 650). With the hitch assembly 640 securely coupled to the vehicle via the hitch receiver adapter 650, the robotic system 100 may be operable to raise the body 101 off a ground surface by actuating the height adjustment mechanism 180 as similarly described and shown above with respect to hitch assembly 140 (FIGS. 14 and 16A-16B). In some embodiments, the coupling mechanism 150 may be disposed within the hitch receiver adapter 650, positioned about the hitch assembly 640, and/or at various other locations relative to the robotic system 100 without departing from a scope of the present disclosure. It should be understood that in other embodiments the hitch assembly 640 may include various other coupling mechanisms for securing the robotic system 100 to a hitch receiver of a vehicle, such as, for example, a cotter pin.

Figure 11:
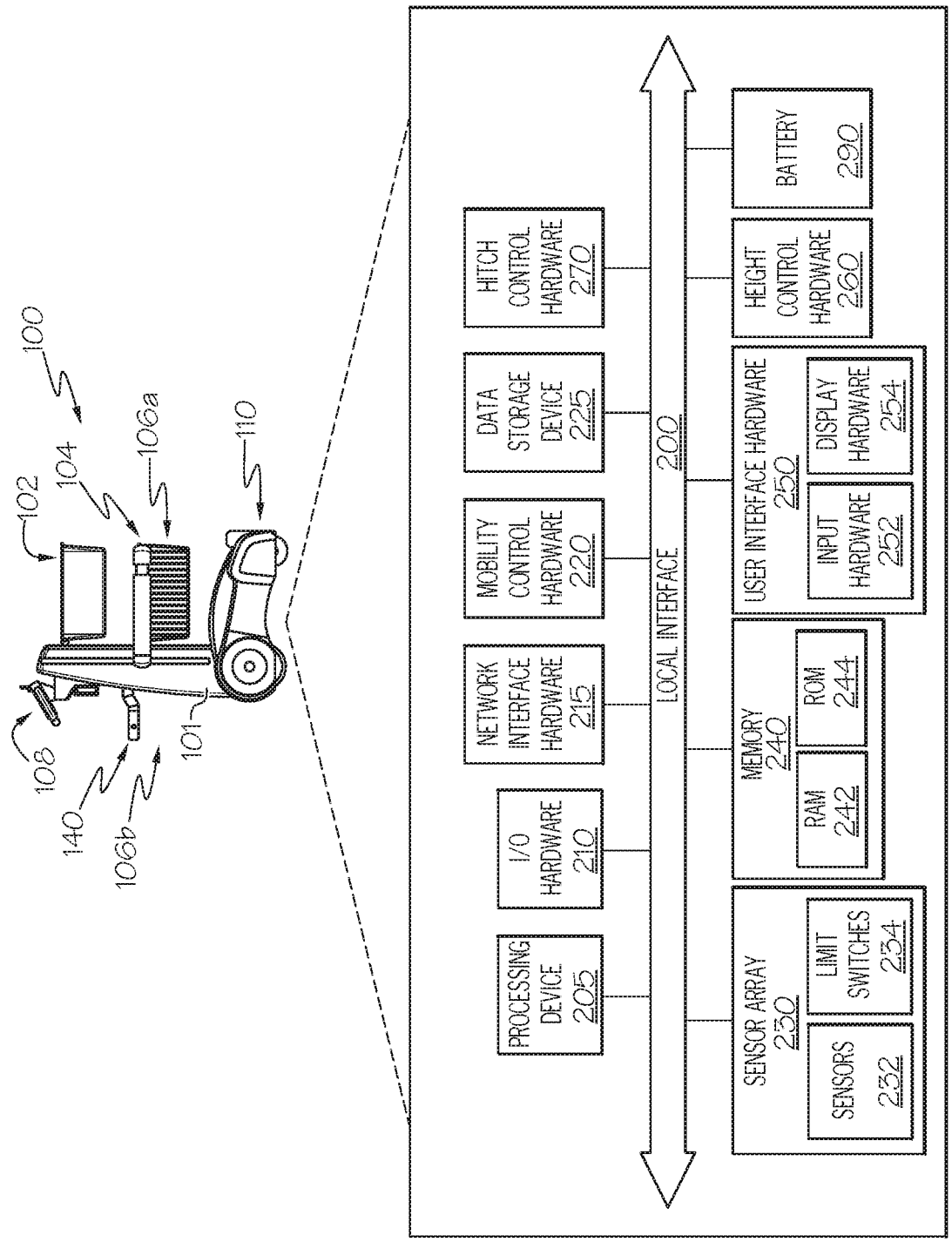
FIG. 11 schematically depicts illustrative hardware components of a robotic system according to one or more embodiments shown and described herein.
Figure 12:
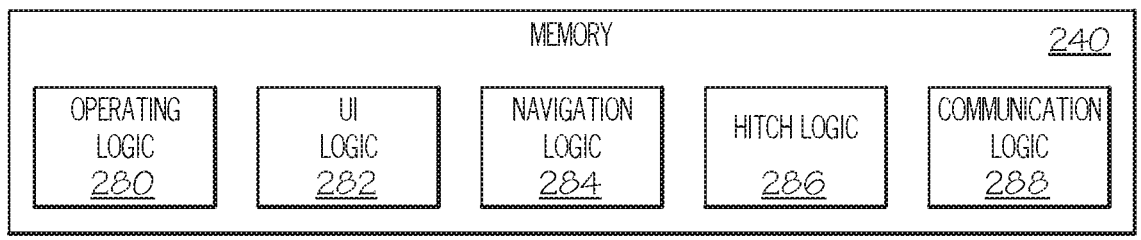
FIG. 12 schematically depicts an illustrative memory component containing illustrative logic components according to one or more embodiments shown and described herein.
Figure 13:
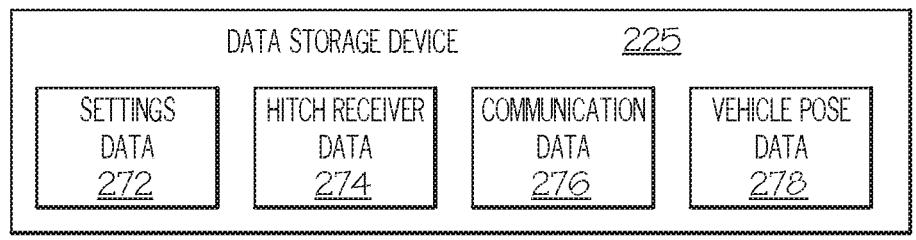
FIG. 13 schematically depicts an illustrative data storage device containing illustrative data components according to one or more embodiments shown and described herein.

FIGS. 11-13 schematically depicts illustrative hardware components of the robotic system 100 that may be used to provide the functionality of the robotic system 100 described above and further detailed herein. The robotic system 100 may have a non-transitory computer-readable medium containing one or more programming instructions for completing the various processes described herein, which may be embodied as hardware, software, and/or firmware, according to embodiments shown and described herein. While in some embodiments the various components of the robotic system 100 may be configured as a general purpose computer with the requisite hardware, software, and/or firmware, in other embodiments, the various components of the robotic system 100 may also be configured as a special purpose computer designed specifically for performing the functionality described herein.

Referring to FIG. 11, the robotic system 100 may include a processing device 205, I/O hardware 210, network interface hardware 215, mobility control hardware 220, a data storage device 225, the sensor array 230, a non-transitory memory component 240, user interface hardware 250, height control hardware 260, and hitch control hardware 270. A local interface 200, such as a bus or the like, may interconnect the various components. The processing device 205, such as a computer processing unit (CPU), may be the central processing unit of the robotic system 100, performing calculations and logic operations to execute a program. The processing device 205, alone or in conjunction with the other components, is an illustrative processing device, computing device, processor, or combination thereof. The processing device 205 may include an processing component configured to receive and execute instructions (such as from the data storage device 225 and/or the memory component 240).

The memory component 240 may be configured as a volatile and/or a nonvolatile computer-readable medium and, as such, may include random access memory 242 (including SRAM, DRAM, and/or other types of random access memory), read only memory (ROM) 244, flash memory, registers, compact discs (CD), digital versatile discs (DVD), and/or other types of storage components. The memory component 240 may include one or more programming instructions thereon that, when executed by the processing device 205, cause the processing device 205 to complete various processes, such as the processes described herein with respect to FIGS. 14 and 17-18. The programming instructions stored on the memory component 240 may be embodied as a plurality of software logic modules, where each logic module provides programming instructions for completing one or more tasks, as described in greater detail below with respect to FIG. 12.

Still referring to FIG. 11, the network interface hardware 215 may include any wired or wireless networking hardware, such as a modem, LAN port, wireless fidelity (Wi-Fi) card, WiMax card, mobile communications hardware, and/or other hardware for communicating with other networks and/or devices, including the vehicle to which the robotic system 100 is coupled, as described herein. The data storage device 225, which may generally be a storage medium, may contain one or more data repositories for storing data that is received and/or generated. The data storage device 225 may be any physical storage medium, including, but not limited to, a hard disk drive (FWD), memory, removable storage, and/or the like. While the data storage device 225 is depicted as a local device, it should be understood that the data storage device 225 may be a remote storage device, such as, for example, a server computing device, cloud based storage device, or the like. Illustrative data that may be contained within the data storage device 225 is described below with respect to FIG. 13.

The I/O hardware 210 may communicate information between the local interface 200 and one or more other components of the robotic system 100. For example, the I/O hardware 210 may act as an interface between the various components described with respect to FIG. 11 and other components of the robotic system 100, such as one or more motors or devices that drive movement and/or steering of the wheels 115, the actuation mechanism 170 that drives movement of the hitch assembly 140, an actuator assembly 184 that drives movement of a height adjustment mechanism 180 (FIGS. 3A-3C), and/or the like. The I/O hardware 210 may be utilized to transmit one or more commands to the other components of the robotic system 100 in some embodiments.

The user interface hardware 250 may include various hardware components for communicating with a user of the robotic system 100, such as, for example, input hardware 252, and display hardware 254. The input hardware 252 may include devices such as, for example, a keyboard, a mouse, a joystick, a camera, a touch screen, a microphone, a wireless remote control device, and/or another device for receiving inputs from a user. The display hardware 254 may include devices such as a video card, a monitor, and/or another device for sending and/or presenting visual data, to a user. The display hardware 254 may also incorporate audio output hardware or the like that generates and presents audible data to a user, such as spoken words, tones, and/or the like. It should be understood that the user interface hardware 250 may be integrated with the user interface device 108 and a touch screen display described above with respect to FIG. 1.

Still referring to FIG. 11, the mobility control hardware 220 may be one or more hardware components for controlling movement of the various components of the robotic system 100, such as movement and steering of the wheels 115. Such hardware components may generally be configured to generate and transmit one or more signals to one or more motors coupled to the wheels 115 to effect movement of the wheels 115 (FIG. 1) or the like. The one or more sensors 232 may generally include the various sensors described herein, including the sensors included within the sensor array 230, such as, for example a pose sensor and/or a receive sensor (FIG. 1). The sensors 232 may receive sensed information and transmit signals and/or data corresponding to the sensed information to one or more components described herein. For example, the sensors 232 may receive images and/or image data via the sensor array 230 and generate one or more signals and/or data to transmit to the processing device 205 for processing the data and determining control of the robotic system 100 for maneuvering the robotic system 100 toward a vehicle, aligning the hitch assembly 140 with a hitch receiver of a vehicle, and/or coupling or decoupling the coupling mechanism 150 to a hitch receiver as described in greater detail herein.

The height control hardware 260 may generally include one or more components for controlling movement of a height adjustment mechanism 180 (FIGS. 3A-3C), such as an upward and downward movement thereof. Such hardware may transmit signals to an actuator assembly 184 of the height adjustment mechanism 180 to move and/or rotate the hitch assembly 140 accordingly relative to the body 101 of the robotic system 100. The hitch control hardware 270 may generally include one or more components for controlling movement of the coupling mechanisms 150 (FIGS. 5A-5C, 6A-6B and/or 7A-7B). Such hardware may transmit signals to an actuation mechanism 170 to translate the cam feature 160 of the coupling mechanism 150 (see FIGS. 4-5). It should be understood that in other embodiments the robotic system 100 may include various other coupling mechanisms configured to secure the hitch assembly 140 to a hitch receiver of a vehicle other than those shown and described herein without departing from a scope of the present disclosure.

Still referring to FIG. 11, the program instructions contained on the memory component 240 (including the RAM 242 and the ROM 244) may be embodied as a plurality of software modules, where each module provides programming instructions for completing one or more tasks. For example, FIG. 12 schematically depicts the memory component 240 containing illustrative logic components according to one or more embodiments shown and described herein. The memory component 240 may be configured to store various processing logic, such as, for example, operating logic 280, user interface (UI) logic 282, navigation logic 284, hitch logic 286, and/or communication logic 288 (each of which may be embodied as a computer program, firmware, or hardware, as an example). The operating logic 280 may include an operating system and/or other software for managing components of the robotic system 100 (FIG. 11). The UI logic 282 may include one or more programming instructions for providing a user interface to a user and receiving commands from the user. The navigation logic 284 may include one or more programming instructions for directing movement of the robotic system 100, including autonomous and semiautonomous movement around a space, toward a vehicle, in alignment with a hitch receiver of a vehicle, and/or the like, as described in greater detail herein.

The hitch logic 286 may include one or more programming instructions for directing movement of the hitch assembly 140 of the robotic system 100, including retracting the hitch assembly 140 into the body 101 (FIG. 18), extending the hitch assembly 140 out from the body 101 (FIG. 17), vertically translating the hitch assembly 140 relative to a longitudinal length of the body 101 to align with a hitch receiver of a vehicle (FIG. 17), and/or the like, as described in greater detail herein. The robotic system 100 further includes a battery 290 for generating and distributing electrical power to the various components of the robotic system 100 shown and described above, such as, for example, via the local interface 200. It should be understood that in other embodiments the battery 290 may include various other forms and/or devices configured to supply power to the components of the robotic system 100. The communication logic 288 may include one or more programming instructions for transmitting data and/or information (e.g., communication data 276) between a vehicle and the robotic system 100. In some embodiments, the communication logic 288 further includes programming instructions for directing the retrieval of electrical power from a vehicle for charging the battery 290 of the robotic system 100 when the robotic system 100 is secured to the vehicle.

Figure 17:
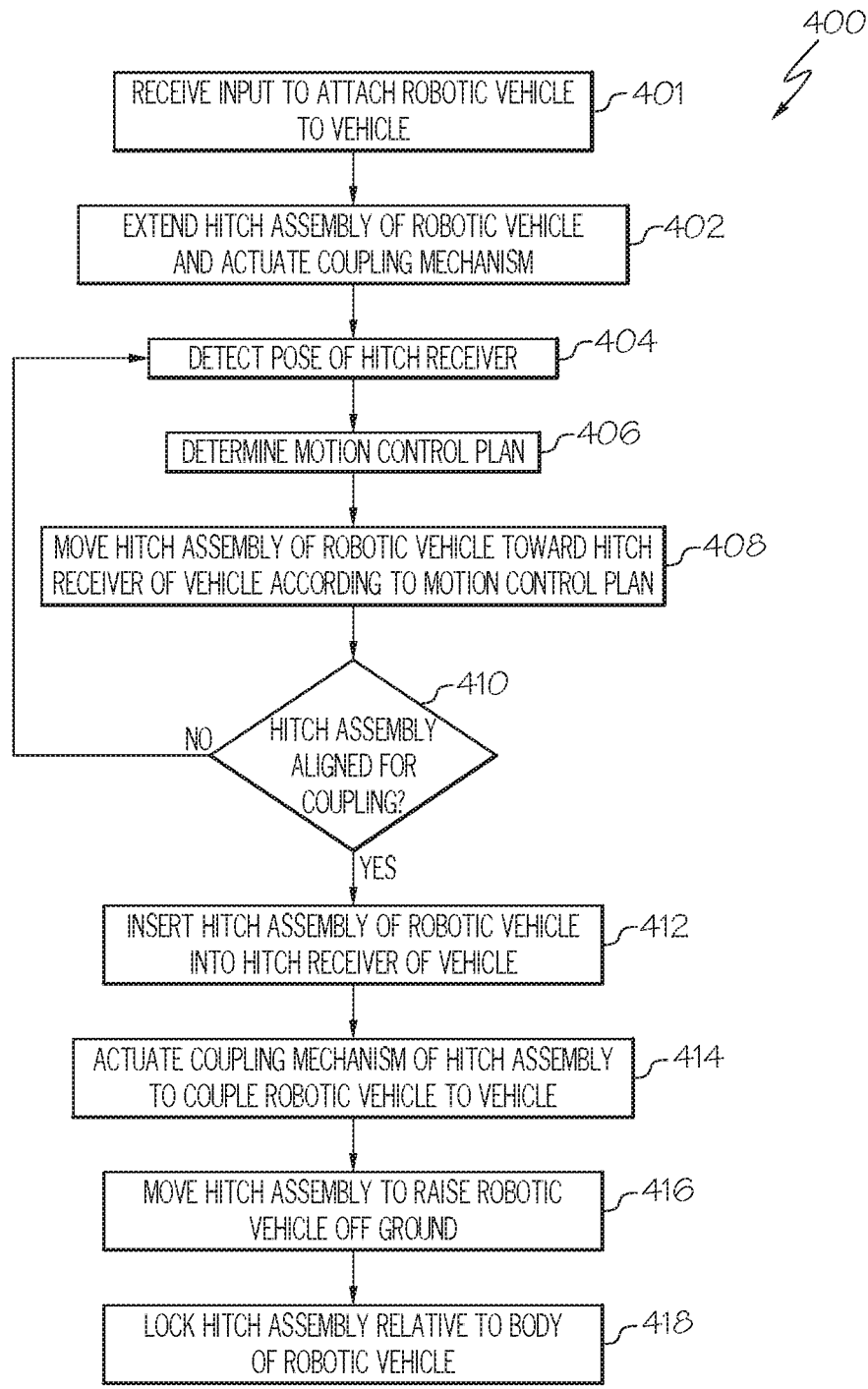
FIG. 17 depicts a flow diagram of an illustrative method of determining a location of a hitch receiver of a vehicle and coupling the hitch assembly of FIG. 1 thereto according to one or more embodiments shown and described herein.

FIG. 13 schematically depicts a block diagram of various data contained within a storage device (e.g., the data storage device 225) of a computing device and/or a vehicle component according to one or more embodiments shown and described herein. The data storage device 225 may include, for example, settings data 272, hitch receiver data 274, communication data 276, and/or vehicle pose data 278. Settings data 272 may include, for example, data associated with particular user settings for the robotic system 100, such as UI preferences settings, control preferences settings, and/or the like. Hitch receiver data 274 may generally refer to information relating to sensed characteristics by the one or more sensors 232 of the sensor array 230, such as, for example, pose data of a hitch receiver of a vehicle when the robotic system 100 operates in an autonomous coupling mode (FIG. 17). Hitch receiver data 274 may further refer to a database of stored information relating to hitch receivers of vehicles that the robotic system 100 has previously coupled to, for purposes of facilitating future instances of coupling the robotic system 100 to the hitch receiver.

Figure 14:
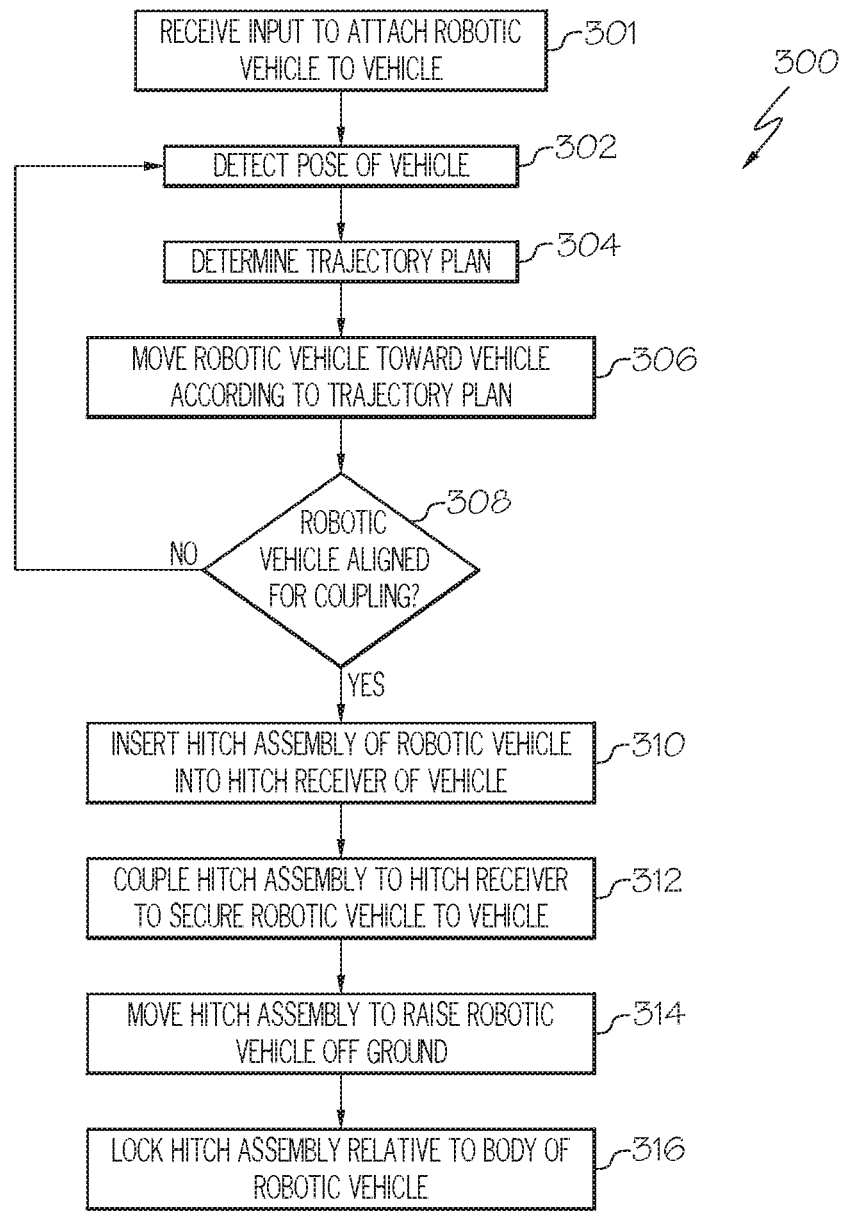
FIG. 14 depicts a flow diagram of an illustrative method of determining a location of a vehicle and coupling the robotic system of FIG. 1 thereto according to one or more embodiments shown and described herein.

Communication data 276 may generally be data that corresponds to communications between the robotic system 100 and the vehicle to which the robotic system 100 is mounted or can be mounted, such as, for example, image data corresponding to a particular vehicle such that the vehicle can be recognized, QR code data for recognizing a vehicle, data that is communicated between a vehicle and the robotic system 100 (e.g., handshake data) via the coupling mechanism 150, input signals initiating a coupling and/or decoupling of the robotic system 100 from a hitch receiver of a vehicle, and/or the like. Additionally, the communication data 276 may further be data indicating a current state of the robotic system 100, such as, for example, whether the robotic system 100 is engaged with the vehicle, approaching the vehicle, with the hitch assembly 140 in a stowed position or hitching position, and/or the like. Vehicle pose data 278 may generally refer to information relating to sensed characteristics as detected by the one or more sensors 232 of the sensor array 230, such as, for example, pose data of a rear side of a vehicle when the robotic system 100 is operating in an autonomous coupling mode (FIG. 14). Vehicle pose data 278 may further refer to a database of stored information relating to vehicles that the robotic system 100 has previously coupled to for facilitating future instances of coupling the robotic system 100 to the vehicle.

It should be understood that the components illustrated in FIGS. 11-13 are merely illustrative and are not intended to limit the scope of this disclosure. More specifically, while the components in FIGS. 11-13 are illustrated as residing within the robotic system 100, this is a nonlimiting example. In some embodiments, one or more of the components may reside external to the robotic system 100. As mentioned above, the various components described with respect to FIGS. 11-13 may be used to carry out one or more processes and/or provide functionality for moving the robotic system 100, for guiding the robotic system 100 toward a vehicle, for aligning the hitch assembly 140 of the robotic system 100 with a hitch receiver of a vehicle, for actuating the coupling mechanism 150 of the hitch assembly 140, for receiving user inputs, and/or the like, Illustrative examples of the various processes are described with respect to FIGS. 14 and 17-18 herein below.

The various components of the robotic system 100 described above with respect to FIGS. 1-12 may be collectively used to autonomously navigate the robotic system 100 toward a vehicle, detect a position of a hitch receiver of a vehicle, autonomously move the hitch assembly 140 in alignment with a hitch receiver of a vehicle, mate the robotic system 100 with a vehicle, and/or lift the robotic system 100 off a around surface. As previously mentioned, FIGS. 13 and 16-17 depict various processes that may be completed by the robotic system 100 and/or one or more components thereof for autonomous or semiautonomous operation of the robotic system 100. The various processes described with respect to FIGS. 13 and 16-17 may generally be completed by the robotic system 100 or a component thereof, such as, for example, the processing device 205 (FIG. 11).

Referring now to FIG. 14, an illustrative method of detecting a pose of a vehicle with the sensor array 230 of the robotic system 100 and autonomously coupling the hitch assembly 140 to a hitch receiver of the vehicle is depicted, generally designated 300, according to some embodiments. The various steps described with respect to FIG. 14 are merely illustrative, and additional, fewer, or alternative steps are contemplated without departing from the scope of the present disclosure. It should be understood that in some embodiments, the robotic system 100 is not configured to autonomously hitch to a vehicle. In addition, the steps described with respect to FIG. 14 are generally completed when the robotic system 100 is positioned in proximity to a vehicle while the vehicle is parked (i.e., not moving).

In the present example, an operator of the robotic system 100 may utilize the robotic system 100, and in particular the storage compartments 102, 104, to store one or more goods (e.g., groceries) during a collection event of the goods (e.g., shopping at a grocery store) to minimize the necessity for the operator to physically hold the goods. Upon conclusion of the collection event, the operator may desire to transport said goods, and in particular the robotic system 100 storing said goods, from the origin location of the goods (i.e., the store) to a final destination (e.g., a home). In this instance, the operator may initiate the method shown and described herein to secure the robotic system 100 to a vehicle for purposes of facilitating transportation of the robotic system 100 and the goods stored therein from the origin location to the final destination.

Initially at step 301, an input indicative of a coupling command may be received via the user interface device 108 on the robotic system 100, a remote control device that transmits a wireless signal to the robotic system 100, and/or a device within the vehicle that transmits the command to the robotic system 100. Upon receiving such a command, a determination may be made as to whether the vehicle is nearby. Such a determination may generally be completed by analyzing data provided by one or more sensors 232 of the robotic system 100 to determine whether the data is indicative of a vehicle.

At step 302, the one or more programming instructions included in the memory component 240, when executed by the processing device 205, causes the processing device 205 to initiate the one or more sensors 232 of the sensor array 230 to sense an area adjacent to the back side 106b of the robotic system 100 and provide data corresponding to the area. The data may then be used to guide the robotic system 100 towards a detected-vehicle in an appropriate manner. In particular, the operating logic 280 provides for managing the one or more sensors 232 to detect a presence of any objects within a field of view of the one or more sensors 232. As described in detail above, the one or more sensors 232 for detecting a presence and/or location coordinates of the vehicle may include, for example, a pose sensor 232 positioned within the sensor array 230 of the robotic system 100. Accordingly, the pose sensor 232 is capable of capturing one or more images indicating pose and/or location characteristics of a vehicle (i.e., vehicle pose data 278), a hitch receiver of a vehicle (i.e., hitch receiver data 274), and/or the like.

At step 304, upon detecting and storing the vehicle pose data 278 of the vehicle, the navigation logic 284 stored in the memory component 240, when executed by the processing device 205, causes the processing device 205 to determine a trajectory plan. In particular, determining a trajectory plan includes the navigation logic 284 initially performing a pose estimation of the vehicle to accurately determine a location of the vehicle based on the vehicle pose data 278 retrieved by the pose sensor 232. In some embodiments, the navigation logic 284 may include an algorithm, such as, for example, Canny Edge Detection for performing the pose estimation of the vehicle. In this instance, the pose sensor 232 obtains a plurality of images at various light levels. Using the Canny Edge Detection process, the navigation logic 284 filters a structural outline of any objects detected from the plurality of images and extracts identified line segments to thereby compute a rendition of the vehicle.

Figure 15:
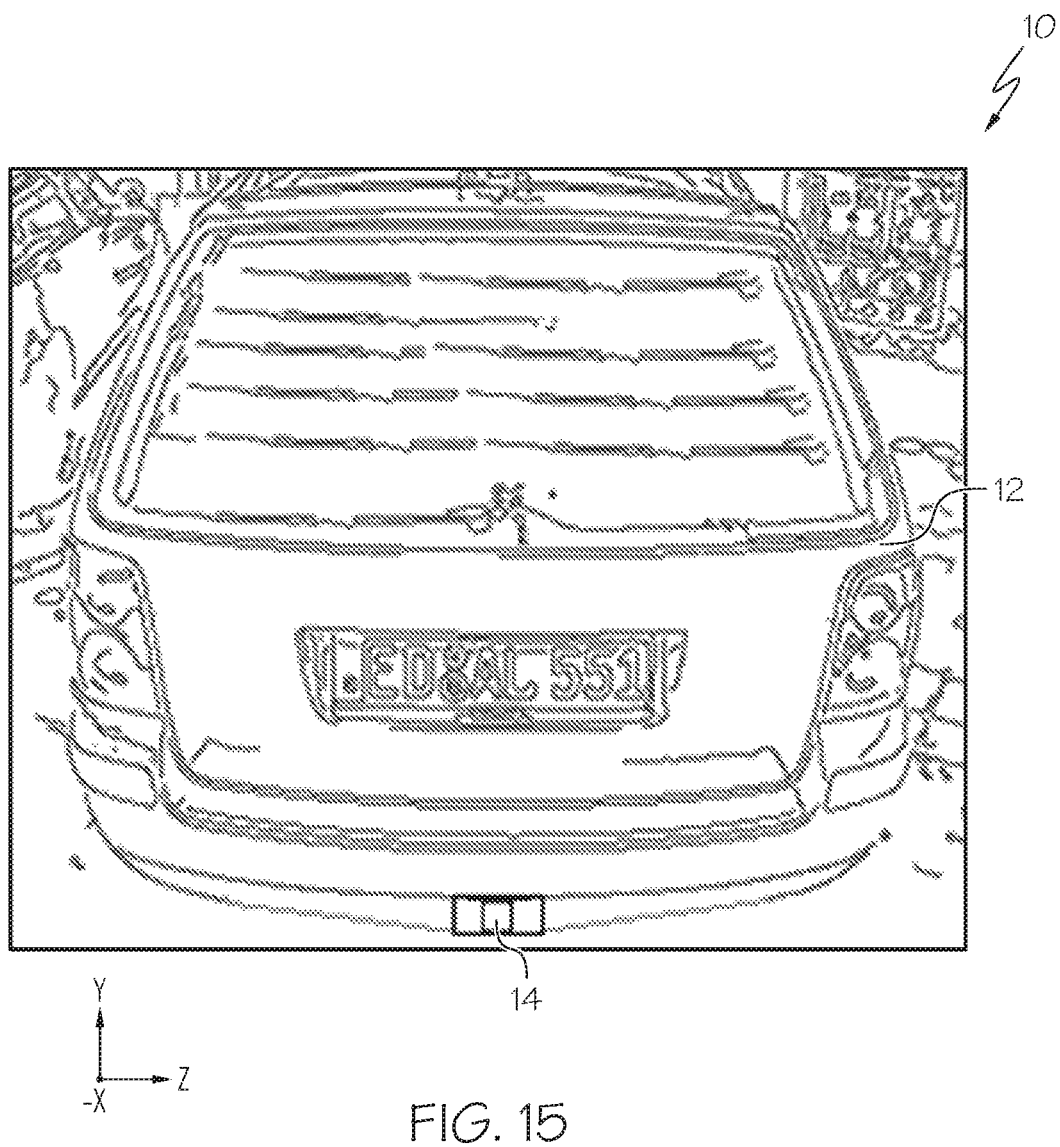
FIG. 15 schematically depicts a visual representation of a computer rendition generated by the robotic system of FIG. 1 for identifying a location of a hitch receiver of a vehicle according to one or more embodiments shown and described herein.

For illustrative purposes only, a schematic illustration of the resulting computer rendition generated by the Canny Edge Detection process is depicted in FIG. 15. The Canny Edge Detection algorithm implemented by the navigation logic 284 serves to detect a wide range of physical edges captured in the plurality of images generated by the pose sensor 232, and applies a filter to smooth the image and remove ancillary noise (e.g., line segments) to accurately define the contours of a vehicle 10. Ultimately, the navigation logic 284 finalizes the detection of edges by suppressing any edges that are determined to be weak and/or not connected to the more-defined edges of the vehicle 10, thereby resulting in an accurate rendition of the objects detected by the pose sensor 232, including, for example, a rear side 12 of the vehicle 10 and/or a hitch receiver 14 of the vehicle 10.

Figure 16A:
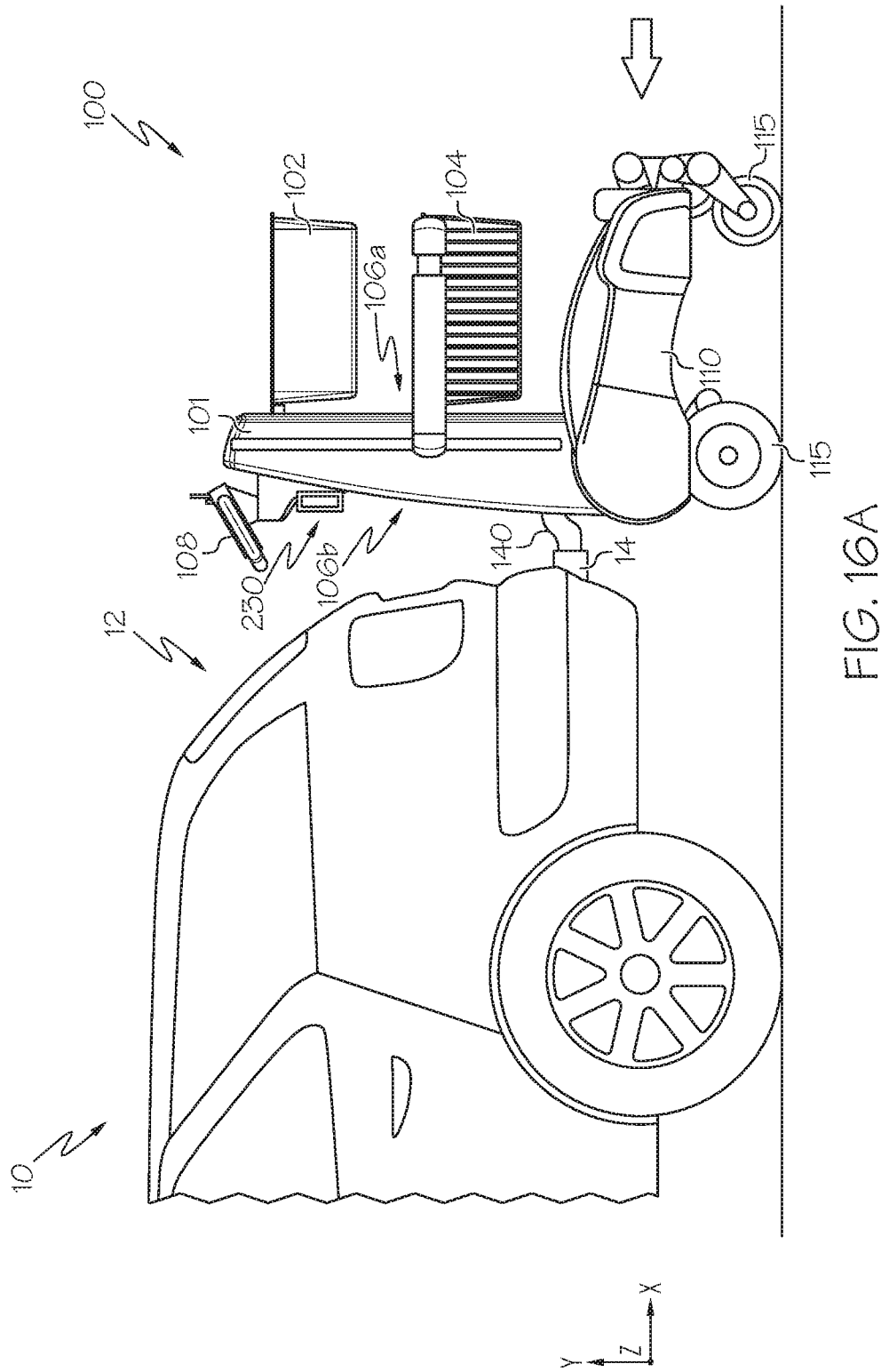
FIG. 16A schematically depicts the hitch assembly of the robotic system of FIG. 1 coupled to a hitch receiver of a vehicle according to one or more embodiments shown and described herein.

In the present example, the robotic system 100 is arranged such that the back side 106b thereof is facing a rear side 12 of a vehicle 10 (FIGS. 16A-15B). The vehicle 10 may generally be any vehicle that is configured for receiving and transporting the robotic system 100 (FIG. 1) according to the embodiments described herein. The vehicle 10 may generally have a hitch receiver 14 positioned along the rear side 12. In some embodiments, the vehicle 10 may be any vehicle that has a standard hitch receiver. In other embodiments, the vehicle 10 may be a vehicle that is particularly configured to receive the robotic system 100. In both embodiments, the robotic system 100 may be coupled to the vehicle 10 via the hitch receiver 14 such that the robotic system 100 can couple to any vehicle, regardless of whether the vehicle is the user's primary vehicle.

Still referring to FIG. 15, by producing the calculated rendition of the rear side 12 of the vehicle 10, the navigation logic 284 may accurately calculate a distance separating the robotic system 100 from the vehicle 10. Accordingly, by determining a location and distance of the vehicle 10 relative to the robotic system 100, the processing device 205 determines a proposed travel trajectory plan for the robotic system 100 to autonomously navigate and position the robotic system 100 at and/or near the rear side 12 of the vehicle 10. It should be understood that the navigation logic 284 may include various other algorithms or software modules for analyzing the vehicle pose data 278 detected by the pose sensor 232, for identifying a location of the vehicle 10 from the vehicle pose data 278, and/or for determining a travel trajectory plan for the robotic system 100. For example, in other embodiments the navigation logic 284 of the robotic system 100 may include a Hough Transform process, an image recognition algorithm, shape recognition analysis, beacon based recognition process, and/or the like. By way of further example, the algorithms implemented by the navigation logic 284 may provide detection of one or more different colors to facilitate an identification and localization of different physical components of the vehicle 10. In particular, surfaces and/or edges of various vehicle components may be colored differently, such as the hitch receiver 14, to facilitate a distinction of the specific vehicle component from other components of the vehicle 10 along the rear side 12. In this instance, one or more sensors 232 of the sensor array 230 may be configured to detect the various vehicle components (e.g., the hitch receiver 14) by the distinguishing colors such that the navigation logic 284 identifies said features by the various colors.

Referring back to FIG. 14, at step 306, the robotic system 100 moves (e.g., autonomously and/or semi-autonomously) in accordance with the travel trajectory plan toward the vehicle 10 by the processing device 205 transmitting one or more signals to the mobility control hardware 220, and in particular to the motors coupled to the wheels 115 of the robotic system 100. At step 308, the navigation logic 284 continuously determines whether the robotic system 100 is properly aligned with the vehicle 10 for coupling, and in particular whether the hitch assembly 140 is properly aligned with the hitch receiver 14 of the vehicle 10. In response to determining that the robotic system 100 is not aligned with the rear side 12 of the vehicle 10, the navigation logic 284 causes the processing device 205 to repeat steps 302, 304 and 306 described above. It should be understood that the processing device 205 may continuously repeat the above-described steps until the robotic system 100 is aligned with the rear side 12 of the vehicle 10. In other words, the robotic system 100 may periodically verify that it is accurately moving as planned so as to align itself, and in particular the hitch assembly 140, with the rear side 12 of the vehicle 10.

At step 310, in response to confirming that the robotic system 100 is properly positioned and aligned with the rear side 12 of the vehicle 10, the hitch logic 286 provides for the insertion of the hitch assembly 140 into the hitch receiver 14 of the vehicle 10 by transmitting one or more signals to the height control hardware 260. As will be described in greater detail below with respect to FIG. 17, the hitch logic 286 further provides for a deployment of the hitch assembly 140 from a stowed position (FIG. 3A) to a hitching position (FIG. 3B). Referring now to FIG. 16A, movement of the robotic system 100 towards the rear side 12 of the vehicle 10 is depicted with the hitch assembly 140 inserted into the hitch receiver 14. In this instance, the hitch assembly 140 is in the hitching position relative to the body 101 and the insertion end 148 of the elongated housing 142 is received within the hitch receiver 14.

Referring back to FIG. 14, at step 312, a coupling signal may be transmitted to the hitch control hardware 270 to couple the robotic system 100 to the vehicle 10. In this instance, the coupling mechanism 150 of the hitch assembly 140 (see FIG. 4) is actuated to couple the hitch assembly 140 to the hitch receiver 14, thereby securing the robotic system 100 to the vehicle 10. It should be understood that the robotic system 100 may be communicatively and/or electrically coupled to the vehicle 10 when the hitch assembly 140 is secured to the hitch receiver 14. With the robotic system 100 coupled to the vehicle 10, the processing device 205 may transmit a signal to the vehicle 10 pursuant to the communication logic 288 to charge the battery 290 as the robotic system 100 remains in electrical communication with the vehicle 10. With the robotic system 100 fixedly coupled to the vehicle 10, the processing device 205 may transmit a signal to the height control hardware 260 to activate the height adjustment mechanism 180. At step 314, the actuator assembly 184 of the height adjustment mechanism 180 is activated to translate the hitch assembly 140 along the track 182 from the first position (i.e., an intermediate height of the hitch assembly 140 relative to the body 101 in alignment with the hitch receiver 14) toward a position at and/or proximate to the second position (i.e., a minimum height of the hitch assembly 140 relative to the body 101).

Figure 16B:
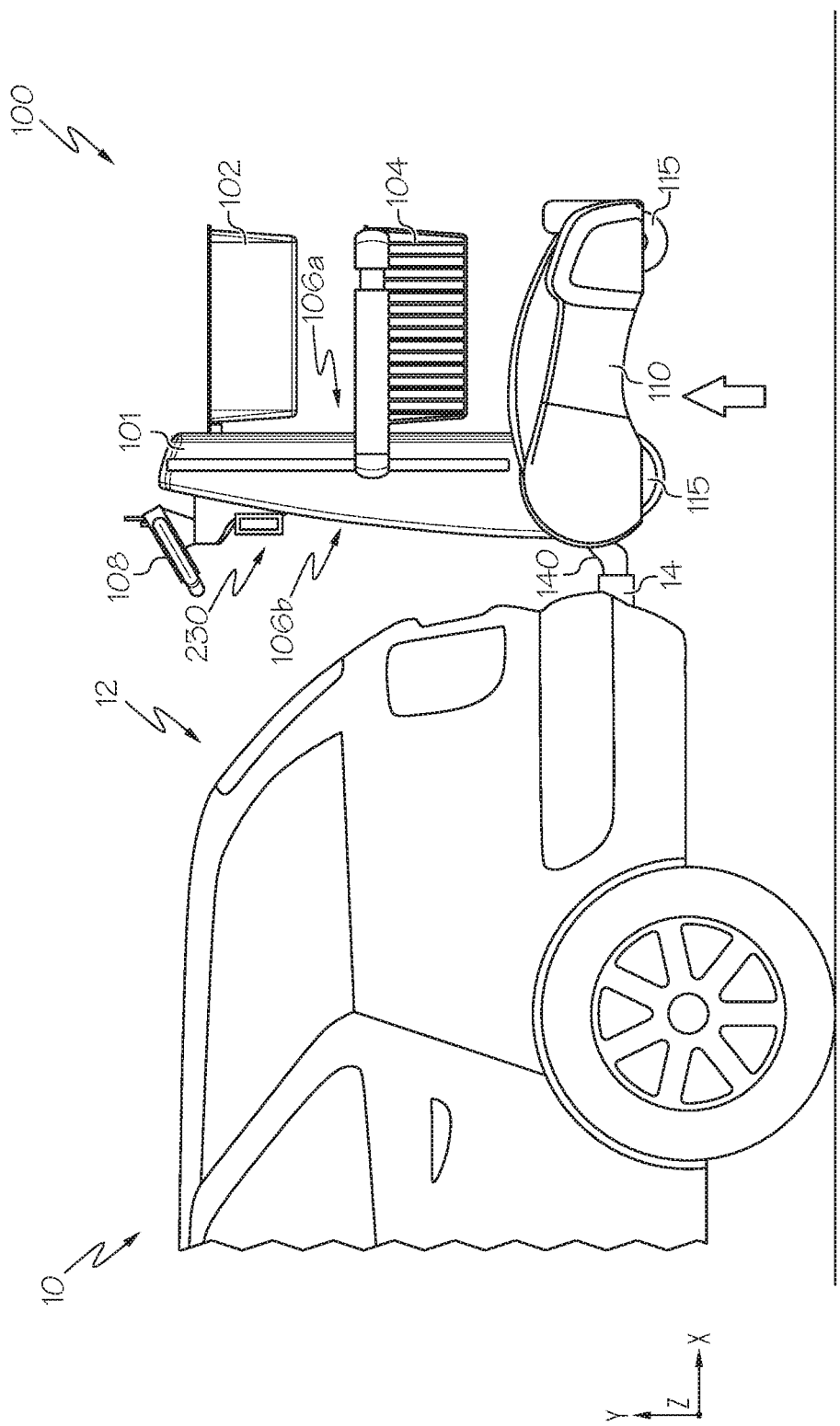
FIG. 16B schematically depicts the hitch assembly of the robotic system of FIG. 1 coupled to a hitch receiver of a vehicle and actuated to raise the robotic system off-ground according to one or more embodiments shown and described herein.

Referring now to FIG. 16B, with the hitch assembly 140 secured to the hitch receiver 14, translation of the hitch assembly 140 relative to the body 101 causes the body 101 to move relative to the vehicle 10. In this instance, the hitch assembly 140 is positioned at the second position with the body 101 of the robotic system 100 effectively lifted off a ground surface supporting the robotic system 100. Accordingly, the robotic system 100 is in a suspended state such that the robotic system 100 may be transported with the vehicle 10 as the vehicle 10 moves (e.g., drives). At step 316, the position of the hitch assembly 140 relative to the body 101 of the robotic system 100 is locked once the hitch assembly 140 is coupled to the hitch receiver 14 via the locking mechanism 186 after the hitch assembly 140 is translated to the second position. Such a locking process may avoid an accidental decoupling of the robotic system 100 from the vehicle 10 and/or a lowering of the robotic system 100 to a ground surface at an unintended time (e.g., during transport).

FIG. 17 depicts an illustrative method of coupling the hitch assembly 140 of the robotic system 100 to a hitch receiver of a vehicle, generally designated 400, according to some embodiments. The various steps described with respect to FIG. 17 are merely illustrative, and additional, fewer, or alternative steps are contemplated without departing from the scope of the present disclosure. In addition, the steps described with respect to FIG. 17 are generally completed when the vehicle is parked (i.e., not moving), however, it should be understood that in other embodiments the steps of method 400 described herein may be performed by the robotic system 100 as the vehicle is in motion.

Initially at step 401, an input indicative of a deployment command may be received via the user interface device 108 on the robotic system 100, a remote control device that transmits a wireless signal to the robotic system 100, and/or a device within the vehicle that transmits the command to the robotic system 100. Upon receiving such a command, the one or more programming instructions included in the hitch logic 286 of the memory component 240, when executed by the processing device 205, causes the processing device 205 to initiate movement of the height control hardware 260. In particular, at step 402, the hitch assembly 140 is deployed from the stowed position (FIG. 3A) to the hitching position (FIG. 3B) by transmitting one or more signals to the actuator assembly 184 of the height adjustment mechanism 180 and translating the coupling end 141 of the hitch assembly 140. As described in greater detail above, translation of the coupling end 141 provides for a simultaneous translation of the pair of pins 149 of the elongated housing 142 along the track 182 such that as the pins 149 translate through the nonlinear segment 183 of the track 182 the elongated housing 142 effectively rotates laterally outward from the body 101, thereby transitioning the hitch assembly 140 to the hitching position (FIG. 3B).

Additionally at step 402, a coupling command may be received at the robotic system 100 to retract the pair of engagement pins 152 of the coupling mechanism 150 into the hollow interior 144 of the elongated housing 142. Upon receiving such a command, the one or more programming instructions included in the hitch logic 286 of the memory component 240, when executed by the processing device 205, causes the processing device 205 to initiate movement of the hitch control hardware 270. In particular, the resilient bias exerted by the biasing mechanism 158 onto the pair of engagement pins 152 is overcome by transmitting one or more signals to the actuation mechanism 170 (e.g., a solenoid) to activate the actuation mechanism 170. In this instance, an electromagnetic force is generated by the solenoid and applied to the cable 172. The cable 172 thereby provides a predetermined translation force onto the cam feature 160 that is greater than the resilient bias exerted on the pair of engagement pins 152 by the biasing mechanism 158. Accordingly, the cam feature 160 translates and engages the pair of protrusions 156 of the pair of tabs 154 against the pair of inner sidewalls 162 until the pair of protrusions 156 are translated from the widened region 168 of the aperture 164 to the narrowed region 169. As a result, with the pair of engagement pins 152 secured to the pair of tabs 154, the pair of engagement pins 152 simultaneously transition from the extended state (FIG. 5A) to the retracted state (FIG. 5B) as the pair of engagement pins 152 are withdrawn into the hollow interior 144 of the elongated housing 142 in unison with the pair of tabs 154. In other embodiments, the robotic system 100 may include various other coupling mechanisms configured to secure the hitch assembly 140 to a hitch receiver of a vehicle other than those shown and described herein without departing from a scope of the present disclosure. In this instance, the hitch logic 286 includes one or more programming instructions that specifically correspond to actuating the particular coupling mechanism included in the hitch assembly 140 to effectively secure the robotic system 100 to a hitch receiver of a vehicle.

At step 404, the one or more programming instructions included in the memory component 240, when executed by the processing device 205, causes the processing device 205 to initiate the one or more sensors 232 of the sensor array 230 to sense an area adjacent to the back side 106b of the robotic system 100 and provide data corresponding to the area. The data may then be used to guide the hitch assembly 140 towards the hitch receiver 14 of the vehicle 10 in an appropriate manner and thereafter couple the hitch assembly 140 to the hitch receiver 14 of the vehicle (FIGS. 16A-15B). The operating logic 280 provides for managing the one or more sensors 232 to detect a presence of the hitch receiver 14 within a field of view of the one or more sensors 232. As described in detail above, the one or more sensors 232 for detecting a presence and/or location of the hitch receiver 14 may include, for example, a receiver sensor 232 positioned within the sensor array 230 of the robotic system 100. Accordingly, the receiver sensor 232 is capable of capturing one or more images indicating pose and/or location characteristics of the hitch receiver 14 (i.e., vehicle pose data 278).

At step 406, upon detecting and storing the vehicle pose data 278 of the hitch receiver 14, the hitch logic 286 stored in the memory component 240, when executed by the processing device 205, causes the processing device 205 to determine a motion control plan. In particular, the hitch logic 286 initially provides for performing a pose estimation of the hitch receiver 14 to accurately determine a location of the hitch receiver 14 based on the vehicle pose data 278 retrieved by the receiver sensor 232. In some embodiments, as described in greater detail above, the hitch logic 286 may include an algorithm, such as, for example, Canny Edge Detection for performing the pose estimation of the hitch receiver 14. In this instance, the receiver sensor 232 obtains a plurality of images at various light levels to filter a structural outline of the hitch receiver 14 and extract identified line segments to thereby compute a computer rendition of the hitch receiver 14 along the rear side 12 of the vehicle 10.

Referring back to FIG. 15, a schematic illustration of the computer rendition generated by the Canny Edge Detection algorithm is depicted with the location of the hitch receiver 14 identified relative to the rear side 12 of the vehicle 10. It should be understood that the hitch logic 286 may include various other algorithms or software modules for analyzing a location of the hitch receiver 14, such as the Hough Transform process, an image recognition algorithm, shape recognition analysis, beacon based recognition process, and/or the like. By producing the calculated rendition of the hitch receiver 14, the hitch logic 286 may accurately calculate a distance (e.g., vertical, horizontal, etc.) separating the hitch assembly 140 from the hitch receiver 14. Accordingly, by determining a location and distance of the hitch receiver 14 relative to the hitch assembly 140, the processing device 205 determines a proposed motion control plan for the hitch assembly 140 to thereby move and position the hitch assembly 140 in alignment with the hitch receiver 14.

Referring back to FIG. 17, at step 408, the hitch assembly 140 moves (e.g., autonomously and/or semi-autonomously) in accordance with the motion control plan toward the hitch receiver 14 by the processing device 205 transmitting one or more signals to the height control hardware 260, and in particular to the actuator assembly 184 of the height adjustment mechanism 180. At step 410, the hitch logic 286 continuously determines whether the hitch assembly 140 is properly aligned with the hitch receiver 14 for coupling. In response to determining that the hitch assembly 140 is not aligned with the hitch receiver 14 of the vehicle 10, the hitch logic 286 causes the processing device 205 to repeat steps 402, 404, 406 and 408 described above. It should be understood that the processing device 205 may continuously repeat the above-described steps until the hitch assembly 140 is aligned with the hitch receiver 14 of the vehicle 10. In other words, the robotic system 100 may periodically verify that the hitch assembly 140 is accurately moving as planned so as to align the insertion end 148 of the elongated housing 142 with the hitch receiver 14 of the vehicle 10.

At step 412, in response to confirming that the hitch receiver 14 is properly positioned and aligned with the hitch receive 14 of the vehicle 10, the hitch logic 286 provides for the insertion of the hitch assembly 140 into the hitch receiver 14. Referring now to FIG. 16A, movement of the hitch assembly 140 towards the hitch receiver 14 of the vehicle 10 is depicted with the insertion end 148 received therein. It should be understood that insertion of the hitch assembly 140 into the hitch receiver 14 is provided by initiating the mobility control hardware 220 of the robotic system 100 to cause actuation of the one or more wheels 115 and thereby move the robotic system 100 toward the rear side 12 of the vehicle 10.

Referring back to FIG. 17, at step 414, a coupling signal may be transmitted to the hitch control hardware 270 to couple the robotic system 100 to the vehicle 10. In this instance, the coupling mechanism 150 of the hitch assembly 140 (see FIGS. 4-5) is actuated to couple the hitch assembly 140 to the hitch receiver 14, thereby securing the robotic system 100 to the vehicle 10. In particular, the actuation mechanism 170 (e.g., a solenoid) is deactivated such that an electromagnetic force generated by the actuation mechanism 170 is terminated and the resilient bias of the biasing mechanism 158 supersedes any counter forces restraining the biasing mechanism 158 to the contracted state, thereby allowing the biasing mechanism 158 (e.g., a spring) to expand outwardly relative to the hollow interior 144 of the elongated housing 142. Accordingly, the pair of tabs 154, and the pair of engagement pins 152 secured thereto, is simultaneously translated laterally outward relative to the elongated housing 142 and the pair of engagement pins 152 is exerted outward from the pair of apertures 146 of the elongated housing 142 (FIG. 5A).

With the robotic system 100 coupled to the vehicle 10, the processing device 205 may transmit a signal to the vehicle 10 pursuant to the communication logic 288 to charge the battery 290 as the robotic system 100 remains in electrical communication with the vehicle 10. With the pair of engagement pins 152 in the extended state, and the elongated housing 142 of the hitch assembly 140 received within the hitch receiver 14 of the vehicle 10, the pair of engagement pins 152 may be received within corresponding apertures of the hitch receiver 14. In this instance, the hitch assembly 140 is effectively coupled to the hitch receiver 14 due to the engagement of the coupling mechanism 150, and in particular the pair of engagement pins 152, with a corresponding coupling mechanism of the hitch receiver 14 (e.g., a pair of corresponding apertures within an interior of the hitch receiver 14).

It should be understood that upon terminating the electromagnetic force generated by the actuation mechanism 170, the cam feature 160 (see FIGS. 4-5) translates within the hollow interior 144 toward the insertion end 148 and thereby engages the pair of protrusions 156 against the pair of inner sidewalls 162 until the pair of protrusions 156 are translated from the narrowed region 169 of the aperture 164 to the widened region 168. As a result, with the pair of engagement pins 152 secured to the pair of tabs 154, the pair of engagement pins 152 transition from the retracted state (FIG. 5B) to the extended state (FIG. 5A) as the pair of engagement pins 152 are extended outwardly relative to the elongated housing 142 in unison with the pair of tabs 154.

It should further be understood that the robotic system 100 may be communicatively and/or electrically coupled to the vehicle 10 when the hitch assembly 140 is secured to the hitch receiver 14. With the robotic system 100 fixedly coupled to the vehicle 10, the height control hardware 260 may transmit a signal to the processing device 205 to activate the height adjustment mechanism 180. At step 416, the actuator assembly 184 of the height adjustment mechanism 180 is activated thereby translating the hitch assembly 140 along the track 182 from a position at and/or proximate to the first position (i.e., a maximum height of the hitch assembly 140 relative to the body 101 in a system vertical direction along a +Y/−Y axes of FIG. 2) toward a position at and/or proximate to the second position (i.e., a minimum height of the hitch assembly 140 relative to the body 101 in a system vertical direction along a +Y/−Y axes of FIG. 2).

Referring now to FIG. 16B, with the hitch assembly 140 secured to the hitch receiver 14, translation of the hitch assembly 140 relative to the body 101 causes the body 101 to move relative to the vehicle 10. In this instance, the hitch assembly 140 is depicted in the second position with the body 101 of the robotic system 100 effectively raised off a ground surface supporting the robotic system 100. Accordingly, the robotic system 100 is in a suspended state such that the robotic system 100 may be transported with the vehicle 10 as the vehicle 10 moves (e.g., drives). At step 418, the position of the hitch assembly 140 relative to the body 101 of the robotic system 100 is locked via the locking mechanism 186 after the hitch assembly 140 is translated to the second position.

Figure 18:
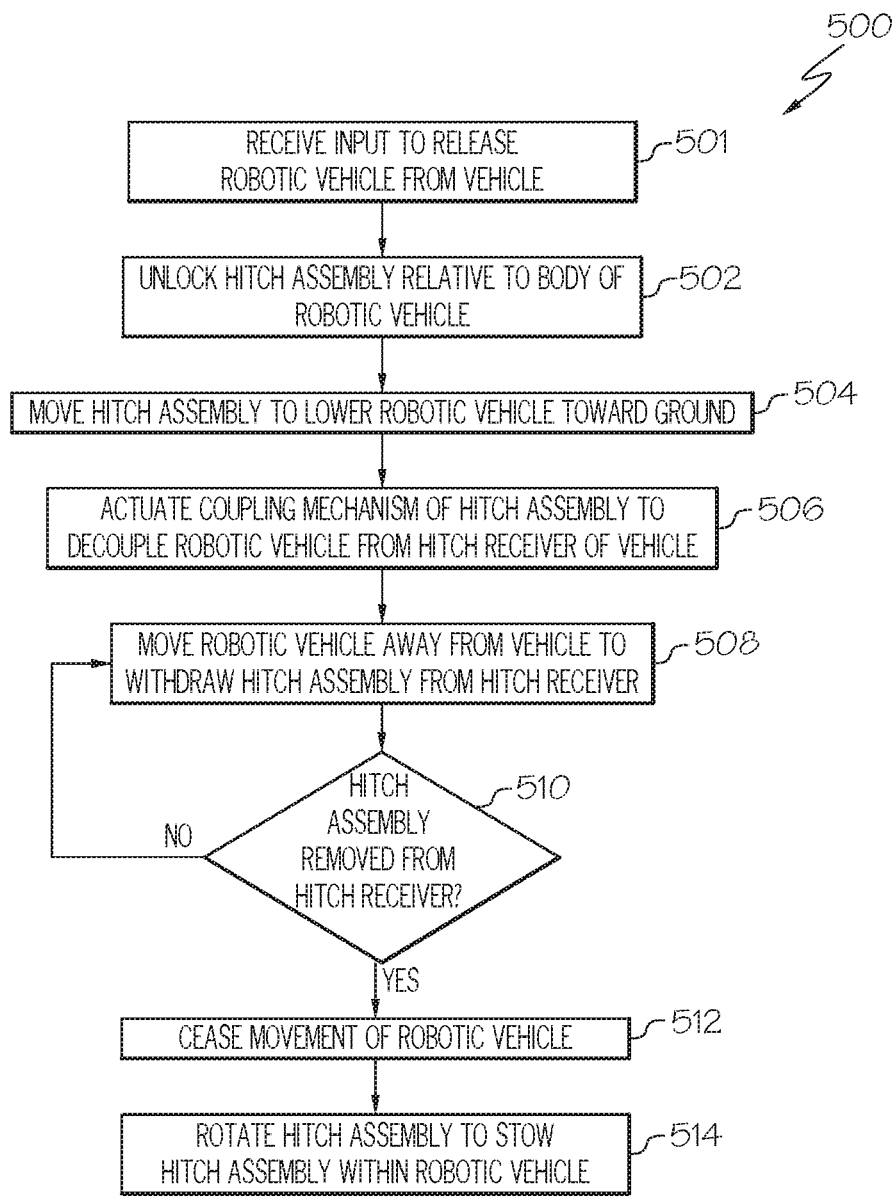
FIG. 18 depicts a flow diagram of an illustrative method of disengaging the hitch assembly of FIG. 1 from a hitch receiver of a vehicle according to one or more embodiments shown and described herein.

FIG. 18 depicts an illustrative method of decoupling the robotic system 100 from a vehicle, generally designated 500, according to some embodiments. The various steps described with respect to FIG. 18 are merely illustrative, and additional, fewer, or alternative steps are contemplated without departing from the scope of the present disclosure. In addition, the steps described with respect to FIG. 18 are generally completed when the robotic system 100 is raised off the ground and the vehicle is parked (i.e., not moving), however, it should be understood that in other embodiments the steps of method 500 described herein may be performed by the robotic system 100 when the vehicle is in motion.

Initially at step 501, an input indicative of a release command may be received via the user interface device 108 on the robotic system 100, a remote control device that transmits a wireless signal to the robotic system 100, and/or a device within the vehicle that transmits the command to the robotic system 100. Upon receiving such a command, the one or more programming instructions included in the hitch logic 286 of the memory component 240, when executed by the processing device 205, causes the processing device 205 to initiate movement of the height control hardware 260, and in particular, transmits a signal to activate the actuator assembly 184 of the height adjustment mechanism 180. At step 502, a position of the hitch assembly 140 relative to the body 101 of the robotic system 100 is unlocked in response to actuation of the locking mechanism 186 to thereby facilitate translation of the hitch assembly 140 from the second hitching position to various other positions.

At step 504, the actuator assembly 184 of the height adjustment mechanism 180 is activated thereby translating the hitch assembly 140 along the track 182 from a position at and/or proximate to the second position (i.e., a minimum height of the hitch assembly 140 relative to the body 101 in a system vertical direction along a +Y>−Y axes of FIG. 2) toward a position at and/or proximate to the first position (i.e., a minimum height of the hitch assembly 140 relative to the body 101 in a system vertical direction along a +Y/−Y axes of FIG. 2). With the hitch assembly 140 secured to the hitch receiver 14, translation of the hitch assembly 140 relative to the body 101 causes the body 101 to move relative to the vehicle 10.

Referring now to FIG. 16B, the hitch assembly 140 is depicted in the second position with the body 101 of the robotic system 100 lifted off a ground surface such that the robotic system 100 is in a suspended state. In this instance, in response to receiving the release command and activating the actuator assembly 184, the body 101 is moved downward toward the around surface until the robotic system 100 is positioned on the ground surface (FIG. 16A).

At step 506, with the robotic system 100 positioned on the ground, a decoupling command may be received at the robotic system 100 to retract the pair of engagement pins 152 of the coupling mechanism 150 (see FIGS. 4-5) into the hollow interior 144 of the elongated housing 142. Upon receiving such a command, the one or more programming instructions included in the hitch logic 286 of the memory component 240, when executed by the processing device 205, causes the processing device 205 to initiate movement of the hitch control hardware 270. In particular, the resilient bias exerted by the biasing mechanism 158 onto the pair of engagement pins 152 is overcome by transmitting one or more signals to the actuation mechanism 170 (e.g., a solenoid) to activate the actuation mechanism 170. In this instance, an electromagnetic force is generated by the solenoid and applied to the cable 172. The cable 172 thereby applies a predetermined translation force upon the cam feature 160 that is greater than the resilient bias exerted on the pair of engagement pins 152 by the biasing mechanism 158.

Accordingly, the cam feature 160 (see FIGS. 4-5) translates within the hollow interior 144 of the elongated housing 142 toward the coupling end 141 and thereby engages the pair of protrusions 156 against the pair of inner sidewalk 162 until the pair of protrusions 156 are translated from the widened region 168 of the aperture 164 to the narrowed region 169. As a result, with the pair of engagement pins 152 secured to the pair of tabs 154, the pair of engagement pins 152 transition from the extended state (FIG. 5A) to the retracted state (FIG. 5B) as the pair of engagement pins 152 are withdrawn into the hollow interior 144 of the elongated housing 142 in unison with the pair of tabs 154. In other embodiments, the robotic system 100 may include various other coupling mechanisms configured to secure the hitch assembly 140 to a hitch receiver of a vehicle other than those shown and described herein without departing from a scope of the present disclosure.

At step 508, in response to confirming that the hitch assembly 140 is properly decoupled from the hitch receiver 14 of the vehicle 10, by disengaging the pair of engagement pins 152 from the corresponding apertures of the hitch receiver 14, the hitch logic 286 provides for the withdrawal of the hitch assembly 140 from the hitch receiver 14 by transmitting one or more signals to the mobility control hardware Movement of the robotic system 100 away from the rear side 12 of the vehicle 10 simultaneously withdraws the hitch assembly 140 from the hitch receiver 14. In this instance, the hitch assembly 140 remains in the hitching position relative to the body 101 with the insertion end 148 removed from within the hitch receiver 14.

At step 510, the hitch logic 286 continuously determines whether the hitch assembly 140 is properly removed from the hitch receiver 14 for decoupling the robotic system 100 from the vehicle 10. In response to determining that the robotic system 100 is not completely decoupled from the vehicle 10, the hitch logic 286 causes the processing device 205 to repeat step 508 described above. It should be understood that the processing device 205 may continuously repeat the above-described step until the hitch assembly 140 is fully removed from within the hitch receiver 14 of the vehicle 10. In other words, the robotic system 100 may periodically verify that it is accurately moving as planned so as to decouple the hitch assembly 140 from the hitch receiver 14.

At step 512, in response to confirming that the hitch assembly 140 is fully removed from the hitch receiver 14 of the vehicle 10, the navigation logic 284 ceases movement of the robotic system 100 by transmitting one or more signals to the mobility control hardware 220. Additionally, a release command may be received at the robotic system 100 to release the pair of engagement pins 152 from the retracted state (FIG. 5B) to the extended state (FIG. 5A). Upon receiving such a command, the one or more programming instructions included in the hitch logic 286 of the memory component 240, when executed by the processing device 205, causes the processing device 205 to terminate activation of the hitch control hardware 270.

In this instance, the actuation mechanism 170 (e.g., a solenoid) is deactivated such that the electromagnetic force generated by the actuation mechanism 170 is terminated and the resilient bias of the biasing mechanism 158 supersedes any counter forces restraining the biasing mechanism 158 to the contracted state, thereby allowing the biasing mechanism (e.g., a spring) to expand outwardly relative to the hollow interior 144 of the elongated housing 142. Accordingly, the pair of tabs 154, and the pair of engagement pins 152 secured thereto, is simultaneously translated laterally outward relative to the elongated housing 142 and the pair of engagement pins 152 is exerted outwardly through the pair of apertures 146 of the elongated housing 142 (FIG. 5A). It should be understood that upon terminating the electromagnetic force generated by the actuation mechanism 170, the cam feature 160 translates within the hollow interior 144 toward the insertion end 148 and thereby engages the pair of protrusions 156 against the pair of inner sidewalls 162 until the pair of protrusions 156 are translated from the narrowed region 169 of the aperture 164 to the widened region 168. As a result, with the pair of engagement pins 152 secured to the pair of tabs 154, the pair of engagement pins 152 transition from the retracted state (FIG. 5B) to the extended state (FIG. 5A) as the pair of engagement pins 152 are extended outwardly relative to the elongated housing 142 in unison with the pair of tabs 154.

At step 514, a stow command may be received via the user interface device 108 on the robotic system 100, a remote control device that transmits a wireless signal to the robotic system 100, and/or a device within the vehicle that transmits the command to the robotic system 100. Upon receiving such a command, the one or more programming instructions included in the hitch logic 286 of the memory component 240, when executed by the processing device 205, causes the processing device 205 to initiate movement of the height control hardware 260. In particular, the hitch assembly 140 is moved from the hitching position (FIG. 3B) to the stowed position (FIG. 3A) by transmitting one or more signals to the actuator assembly 184 of the height adjustment mechanism 180 and translating the coupling end 141 of the hitch assembly 140. As described in greater detail above, translation of the coupling end 141 provides for a simultaneous translation of the pair of pins 149 of the elongated housing 142 along the track 182 such that as the pins 149 translate through the nonlinear segment 183 of the track 182 the elongated housing 142 effectively rotates laterally inward into the body 101, thereby transitioning the hitch assembly 140 to the retracted state (FIG. 3A).

In other embodiments, the hitch logic 286 may include one or more programming instructions that provide for autonomous movement of the height control hardware 260, and more specifically an automatic stowing of the hitch assembly 140 of the robotic system 100. In this instance, the robotic system 100 automatically transitions the hitch assembly 140 to the stow position at step 514 in response to the robotic system 100 ceasing movement at step 512 without requiring receipt of a stow command from an operator of the robotic system 100.

It should now be understood that the robotic systems described herein are configured to be mounted to standard and/or customized trailer hitches on vehicles such that the robotic systems can be transported by the vehicles. The robotic systems described herein generally include various components that couple/decouple the robot systems from a standard vehicle hitch receiver, as well as various components that allow for autonomously navigating the robotic system to a vehicle, autonomously detecting a location of a hitch receiver of a vehicle, and autonomously adjusting a position of a hitch assembly of the robotic system and coupling the hitch assembly to a hitch receiver of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications play be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic system comprising:
    a towable body;
    a hitch assembly coupled to the body;
    a sensor array coupled to the body; and
    a processor communicatively coupled to the sensor array and configured to:
        detect, via the sensor array, a location of a towing vehicle relative to the body;
        detect, via the sensor array, a position of a hitch receiver relative to the towing vehicle;
        move the body toward the towing vehicle to position the hitch assembly proximate to the hitch receiver;
        move the hitch assembly relative to the body and in alignment with the hitch receiver; and
        engage the hitch assembly to the hitch receiver to securely couple the body to the towing vehicle.

2. The robotic system of claim 1, wherein the hitch assembly comprises:
    a housing;
    a pair of pins disposed within the housing, wherein each pin of the pair of pins comprises a tab disposed within the housing;
    a biasing mechanism disposed within the housing and coupled to the tab of each of the pins such that the biasing mechanism extends between the pair of pins, wherein the biasing mechanism biases the tabs of each of the pins laterally outward relative to the housing to thereby extend the pair of pins out from the housing; and
    a cam feature disposed within the housing and coupled to the pair of pins along each of the tabs, the cam feature being translatable within the housing,
    wherein:
        the cam feature overcomes a bias of the biasing mechanism when a force on the cam feature causes the cam feature to translate within the housing, and
        the cam feature engages and retracts the tabs laterally inward relative to the housing to thereby pull the pair of pins into the housing when the cam feature translates within the housing.

3. The robotic system of claim 1, wherein the operating logic further contains programming instructions that cause the processor to determine a trajectory plan for the body to move along in response to the sensor array detecting the location of the towing vehicle relative to the body.

4. The robotic apparatus of claim 3, wherein the operating logic further contains programming instructions that cause the processor to move the body toward the towing vehicle in accordance with the trajectory plan.

5. The robotic apparatus of claim 1, wherein the operating logic further contains programming instructions that cause the processor to periodically determine whether the hitch assembly is aligned with the hitch receiver as the body moves toward the towing vehicle.

6. The robotic apparatus of claim 5, wherein the operating logic further contains programming instructions that cause the processor to insert the hitch assembly into the hitch receiver in response to determining that the hitch assembly is aligned with the hitch receiver.

7. The robotic apparatus of claim 1, wherein the operating logic further contains programming instructions that cause the processor to actuate a coupling mechanism of the hitch assembly to engage the hitch assembly to the hitch receiver to securely couple the body to the towing vehicle.

8. The robotic apparatus of claim 1, wherein the operating logic further contains programming instructions that cause the processor to move the hitch assembly relative to the body in response to the hitch assembly engaging the hitch receiver to thereby raise the body relative to the towing vehicle.

9. The robotic apparatus of claim 8, wherein the body is separated from a ground surface supporting the towing vehicle when raised relative to the towing vehicle.

10. The robotic apparatus of claim 8, wherein the operating logic further contains programming instructions that cause the processor to actuate a locking mechanism of the hitch assembly to securely fasten a position of the hitch assembly relative to the body thereby inhibiting movement of the hitch assembly.

11. The robotic apparatus of claim 1, wherein the operating logic further contains programming instructions that cause the processor to transition the hitch assembly from a stowed state to a hitching state in response to the robotic apparatus receiving an input to couple the body with the towing vehicle.

12. The robotic apparatus of claim 11, wherein the hitch assembly is disposed within the body when in the stowed state and extends laterally outward from the body when in the hitching state.

13. A robotic apparatus comprising:
    a towable body;
    a sensor array coupled to the body and operable to detect a pose of a towing vehicle hitch receiver relative to the body;
    a mobility component configured to move the body toward the towing vehicle hitch receiver in response to the sensor array detecting the pose of the towing vehicle hitch receiver; and
    a hitch assembly configured to move along the body in relative alignment to the towing vehicle hitch receiver in response to the sensor array detecting the pose of the towing vehicle hitch receiver;
    wherein the hitch assembly is configured to translate into and engage the towing vehicle hitch receiver thereby securely coupling the robotic apparatus to the towing vehicle hitch receiver.

14. The robotic apparatus of claim 13, wherein the hitch assembly is further configured to transition from a retracted position disposed within the body to a deployed position extending outwardly from the body in response to the sensor array detecting the pose of the towing vehicle hitch receiver.

15. The robotic apparatus of claim 13, further comprising a processor and operating logic containing programming instructions thereon that, when executed, causes the processor to estimate an alignment of the towing vehicle hitch receiver with the hitch assembly and direct movement of the hitch assembly in response to the sensor array detecting the pose of the towing vehicle hitch receiver.

16. The robotic apparatus of claim 15, wherein the hitch assembly is configured to raise the body relative to the towing vehicle hitch receiver in response to engaging the towing vehicle hitch receiver such that the body is offset from a ground surface as the robotic apparatus is securely coupled to the towing vehicle hitch receiver.

17. A robotic system comprising:
    a towable body;
    a hitch assembly movably coupled to the movable body;
    a sensor array;
    a processor and operating logic containing programming instructions thereon that, when executed, causes the processor to:
        detect a pose of a towing vehicle via the sensor array;
        move the body to the towing vehicle in accordance with a trajectory plan determined based on the pose of the towing vehicle detected by the sensor array;
        detect a pose of a hitch receiver of the towing vehicle via the sensor array;
        move the hitch assembly along the body and in alignment with the hitch receiver based on the pose of the hitch receiver detected by the sensor array; and
        couple the hitch assembly to the hitch receiver to secure the body to the towing vehicle.

18. The robotic system of claim 17, wherein the operating logic containing programming instructions thereon, when executed, causes the processor to:
    deploy the hitch assembly from a stowed state with the hitch assembly disposed within the body to an extended state with the hitch assembly extending outwardly from the body.

19. The robotic system of claim 17, wherein the operating logic containing programming instructions thereon, when executed, causes the processor to:
    move the hitch assembly along the body in response to the hitch assembly coupling the hitch receiver to thereby lift the body relative to the towing vehicle and suspend the body off a ground surface supporting the towing vehicle.

20. The robotic system of claim 17, wherein the operating logic containing programming instructions thereon, when executed, causes the processor to:
    retract a pair of engagement pins of the hitch assembly inwardly in response to the body moving toward the towing vehicle in accordance with the trajectory plan; and
    extend the pair of engagement pins of the hitch assembly outwardly to couple the hitch assembly to the hitch receiver.

\* \* \* \* \*

UNITED STATES PATENT AND TRADEMARK OFFICE
CERTIFICATE OF CORRECTION

PATENT NO. : 11,505,017 B2
APPLICATION NO. : 16/560626
DATED : November 22, 2022
INVENTOR(S) : Aimee S. Goncalves et al.

It is certified that error appears in the above-identified patent and that said Letters Patent is hereby corrected as shown below:

In the Specification

In Column 8, Line(s) 2, delete "ogle" and insert --one--, therefor.

In Column 8, Line(s) 67, delete "around" and insert --ground--, therefor.

In Column 13, Line(s) 23, delete "sidewalk" and insert --sidewalls--, therefor.

In Column 14, Line(s) 43, delete "sidewalk" and insert --sidewalls--, therefor.

In Column 16, Line(s) 33, delete "sidewalk" and insert --sidewalls--, therefor.

In Column 25, Line(s) 40, delete "an" and insert --any--, therefor.

In Column 29, Line(s) 5, delete "around" and insert --ground--, therefor.

In Column 36, Line(s) 55, delete "around" and insert --ground--, therefor.

In Column 37, Line(s) 13, delete "sidewalk" and insert --sidewalls--, therefor.

Signed and Sealed this
Fourteenth Day of February, 2023

Katherine Kelly Vidal
*Director of the United States Patent and Trademark Office*